US012688481B1

(12) United States Patent
Finley et al.

(10) Patent No.: US 12,688,481 B1
(45) Date of Patent: Jul. 21, 2026

(54) METHODS, COMPUTER DEVICES, AND NON-TRANSITORY TANGIBLE COMPUTER-READABLE MEDIUMS FOR PRIORITY ORDER DETAIL KEYWORD SEARCH

(71) Applicant: Route App, Inc., Lehi, UT (US)

(72) Inventors: Alaina Marie Finley, Salt Lake City, UT (US); Yuan Zhang, Draper, UT (US)

(73) Assignee: Route App, Inc., Lehi, UT (US)

( * ) Notice: Subject to any disclaimer, the term of this patent is extended or adjusted under 35 U.S.C. 154(b) by 268 days.

(21) Appl. No.: 17/697,683

(22) Filed: Mar. 17, 2022

Related U.S. Application Data

(60) Provisional application No. 63/162,997, filed on Mar. 18, 2021.

(51) Int. Cl.
| | |
|---|---|
| *G06Q 30/00* | (2023.01) |
| *G06F 16/9535* | (2019.01) |
| *G06Q 10/0833* | (2023.01) |
| *G06Q 30/0601* | (2023.01) |

(52) U.S. Cl.
CPC ..... *G06Q 10/0833* (2013.01); *G06F 16/9535* (2019.01); *G06Q 30/0633* (2013.01)

(58) Field of Classification Search
CPC .......... G06Q 10/0833; G06Q 30/0633; G06Q 30/06331; G06Q 30/06332; G06Q 30/06333; G06Q 30/06334; G06Q 30/0635; G06Q 30/0637; G06Q 10/083; G06Q 10/087; G06F 16/9535

USPC ........................................................ 705/26.1
See application file for complete search history.

(56) References Cited

U.S. PATENT DOCUMENTS

| | | | | |
|---|---|---|---|---|
| 7,293,003 | B2 * | 11/2007 | Horton | G06Q 30/02 |
| | | | | 706/14 |
| 2013/0024525 | A1 * | 1/2013 | Brady | G06Q 10/107 |
| | | | | 709/206 |
| 2014/0181983 | A1 * | 6/2014 | Hart | G06F 21/604 |
| | | | | 726/26 |
| 2014/0317128 | A1 * | 10/2014 | Simeonov | G06F 16/3344 |
| | | | | 707/754 |
| 2017/0098012 | A1 * | 4/2017 | Zhu | G06F 16/24578 |
| 2017/0140048 | A1 * | 5/2017 | Wang | G06Q 10/1093 |
| 2017/0308517 | A1 * | 10/2017 | Josifovski | G06Q 10/10 |
| 2020/0201913 | A1 * | 6/2020 | Terry | G06Q 30/0281 |
| 2020/0211077 | A1 * | 7/2020 | He | G06F 40/20 |

(Continued)

OTHER PUBLICATIONS

A.Q. Mahlawi and S. Sasi, "Structured data extraction from emails," 2017 International Conference on Networks & Advances in Computational Technologies (NetACT), Thiruvananthapuram, India, 2017, pp. 323-328, doi: 10.1109/NETACT.2017.8076789. (Year: 2017).*

*Primary Examiner* — Arielle E Weiner
(74) *Attorney, Agent, or Firm* — Austin Rapp

(57) ABSTRACT

A method by a computing device is described. The method includes receiving an email for an order. The method also includes sorting a keyword list based on priority values of order detail keywords. The method further includes separating the email into fragments. The method additionally includes searching for each of the order detail keywords in the fragments based on the priority values. The method also includes searching for an order detail in response to detecting an order detail keyword in a fragment.

15 Claims, 9 Drawing Sheets

(56)         References Cited

U.S. PATENT DOCUMENTS

2021/0097605 A1*   4/2021   Yeri ................... G06F 16/3346
2021/0118269 A1*   4/2021   Paliga ............. G06Q 20/40145

* cited by examiner

302 Receive an email for an order

304 Sort a keyword list based on priority values of order detail keywords

306 Separate the email into fragments

308 Search for each of the order detail keywords in the fragments

310 Search for an order detail in response to detecting an order detail keyword in a fragment

300

METHODS, COMPUTER DEVICES, AND NON-TRANSITORY TANGIBLE COMPUTER-READABLE MEDIUMS FOR PRIORITY ORDER DETAIL KEYWORD SEARCH

RELATED APPLICATIONS

This application is related to and claims priority from U.S. Provisional Patent Application No. 63/162,997, entitled "PRIORITY ORDER DETAIL KEYWORD SEARCH," filed on Mar. 18, 2021, which is hereby incorporated by reference herein, in its entirety.

TECHNICAL FIELD

The present disclosure generally relates to computers and computer-related technology. More specifically, the present disclosure relates to systems and methods for a priority order detail keyword search.

BACKGROUND

Computing technologies and applications continue to advance at a rapid pace. Computing devices commonly used include everything from mobile hand-held computing devices to large multi-processor computer systems. Computing devices are increasingly linked with other devices, such as servers, through networks.

In some examples, computing devices may be used for e-commerce applications. For example, a vendor website may offer goods or services for purchase. A user may use a computing device to place an order for goods or services through the vendor website.

DETAILED DESCRIPTION

Various examples of the systems and methods are now described with reference to the Figures. The examples of the present systems and methods, as generally described and illustrated in the Figures herein, could be arranged and designed in a wide variety of different configurations. Thus, the following more detailed description of several examples, as represented in the Figures, is not intended to limit the scope of the systems and methods, as claimed, but is merely representative of the various configurations of the systems and methods.

Figure 1:
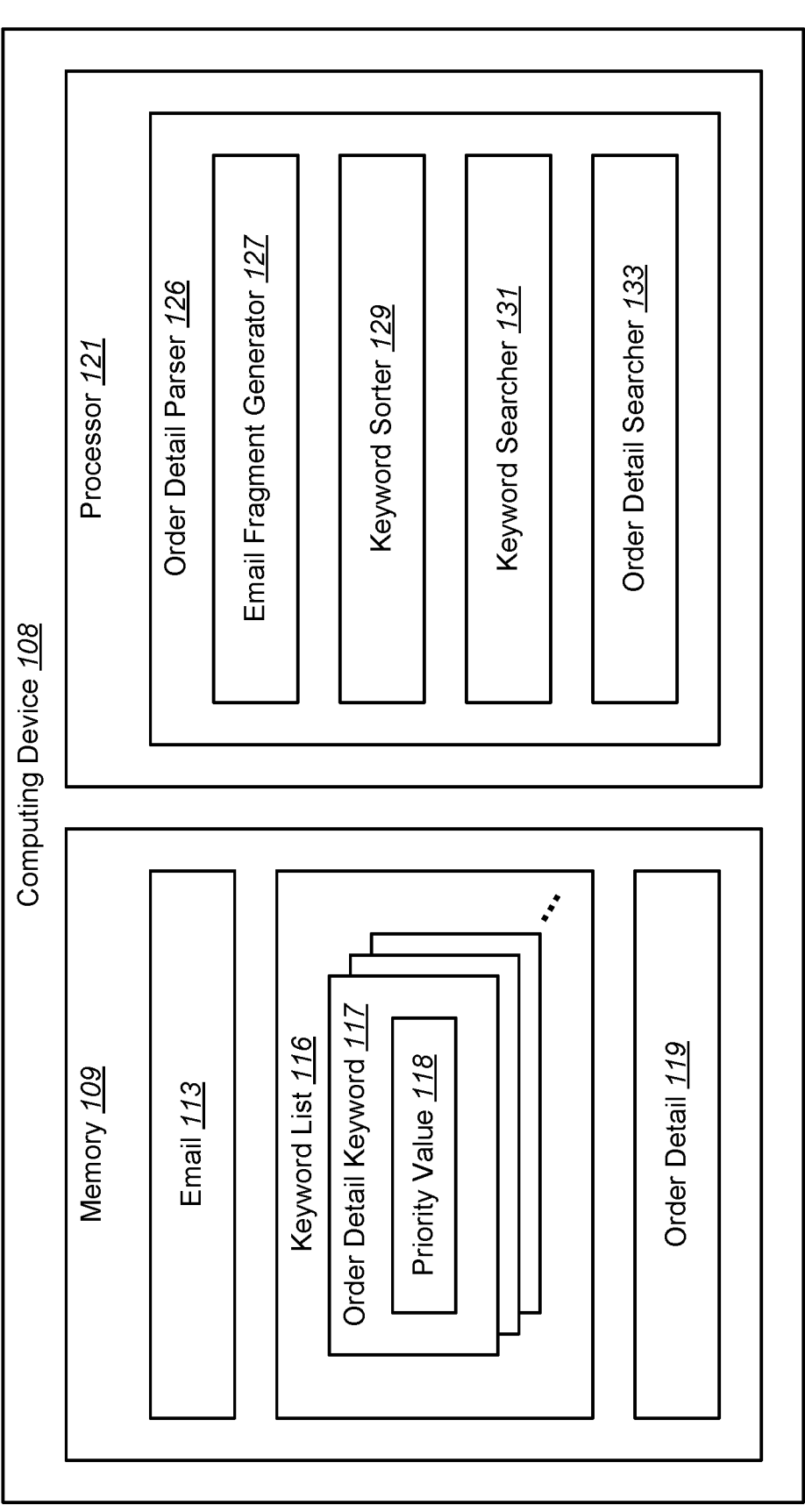
FIG. 1 is a block diagram illustrating one example of a computing device for a priority order detail keyword search.

FIG. 1 is a block diagram illustrating one example of a computing device 108 for a priority order detail keyword search. Examples of the computing device 108 include a desktop computer, laptop computer, tablet computer, mobile communication device, smartphone, etc. The computing device 108 may be configured to communicate in a network environment. For example, the computing device 108 may be a mobile device configured to communicate with a server and/or an e-commerce system over network connections (e.g., internet connections).

The computing device 108 may include processing resources. For example, the computing device 108 may include a processor 121 (e.g., a general-purpose processor, an application-specific processor, an Application-Specific Integrated Circuit (ASIC), a Field Programmable Gate Array (FPGA)), and memory 109 (e.g., volatile memory resources, random access memory (RAM), dynamic RAM, static RAM, persistent memory, battery-backed RAM, and/or the like). The computing device 108 may also include nontransitory storage resources (e.g., a hard drive, solid-state storage device, local storage device, network-attached storage system, and/or the like), network interface resources (e.g., a network interface device, a network interface card, and/or the like), and so on (not shown in FIG. 1 to avoid obscuring details of the illustrated examples).

The computing device 108 may be communicatively coupled to a server (e.g., an email server) via an electronic communication network link. The network link may be established on any suitable means for electronic communication, including, but not limited to: an Internet Protocol (IP) network, the Internet, a wireless network, a Local Area Network (LAN), a Wide Area Network (WAN), a Virtual Private Network (VPN), a wireless network (e.g., IEEE 802.11a-n wireless network, Bluetooth® network, Near-Field Communication (NFC) network, and/or the like), a public switched telephone network (PSTN), a mobile network (e.g., a network configured to implement one or more technical standards or communication methods for mobile data communication, such as Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and/or the like), a combination of networks, and/or the like.

In some examples, the computing device 108 may be used to obtain order details 119 for a transaction made on an e-commerce system. In some examples, the e-commerce system may include computing resources to facilitate online sales of goods and/or services. A vendor of the goods and/or services may operate the e-commerce system. As used herein an "order" includes a transaction for a good(s) or service(s). For example, a user may log into a user account on the e-commerce system to place an order.

One of the challenges involved with e-commerce transactions is obtaining details for an order placed on an e-commerce system. For example, a user may receive a notification (e.g., an email) from the vendor stating that an order has been placed or an order has been shipped. In some examples, the e-commerce system may send a notification (e.g., an order confirmation email, a shipment confirmation email, etc.) associated with an order from a vendor. The order details 119 may include a tracking number and/or an order number for a transaction made on an e-commerce system.

In the examples described herein, the computing device 108 may acquire an order detail (or multiple order details) from an email 113. In some examples, the order detail acquisition may be based on a process for grading data, and an association of priority for order detail keywords 117, as described below. This combination creates a robust, heuristic process that is capable of limiting the scope for parsing an email based on a given priority. The described examples may be used for parsing out (e.g., extracting, identifying, determining, etc.) multiple tracking numbers in emails as well as parsing out order numbers in emails.

In some examples, the order detail keywords 117 may be used to narrow down the scope of a search for a desired order detail (e.g., a tracking number or order number). Once as the scope is narrowed, a regular expression (regex) formulated specifically to likely match an order number or tracking numbers may be used. The scope may be narrowed first rather than solely rely on the regex as the regex can very easily pick up noise signals. Therefore, by performing the prioritized search for order detail keywords 117, an accurate search for order details 119 may be achieved.

In some examples, the computing device 108 may store a keyword list 116 in memory 109. The keyword list 116 may include a number of order detail keywords 117. In some examples, the keyword list 116 may be associated with a certain order detail. For example, in the case that the order detail 119 is a tracking number, the keyword list 116 may include order detail keywords 117 associated with the term "tracking number." Some examples of order detail keywords for a tracking number include "tracking number is", "tracking number:", "track", and/or "tracking." Some examples of order detail keywords for an order number include "order number is", "order number:", and/or "order."

In some examples, each order detail keyword 117 may include a priority value 118. In some examples, the priority value 118 for an order detail keyword(s) may be based on the specificity of the order detail keyword(s) 117 as well as language implying that the wanted order detail 119 is directly after the order detail keyword 117. In some examples, a human (e.g., an engineer designing or maintaining the order detail parser 126) may assign the priority values 118 to the order detail keywords 117.

In some examples, the order detail keywords 117 (e.g., tracking keywords or order number keywords) may have a priority associated with them (e.g., more specific context/keywords have higher priority). The order detail keywords 117 may be stored in a Priority/Keyword Data Structure.

In some examples, a "0" for the priority value 118 may be considered the highest priority. Therefore, an order detail keyword with a priority value of "1" may have a lower priority than an order detail with a priority value of "0."

In some examples, the priority values 118 of the order detail keywords 117 may be optimized through a data driven approach. For example, natural language processing (NLP) techniques may be used to determine the priority values 118 of the order detail keywords 117. Examples include (but are not limited to) determining the frequency of a word or statement or looking at word/statement patterns to determine implication. In this case, the order detail keyword 117 may be the analyzed word or statement.

In the case of a tracking number, examples of this language and high-priority order detail keywords may include "tracking number is", where the word "is" implies that the tracking number is very likely right after this statement. Another example of a high-priority order detail keyword is "tracking number:", where the colon implies that the tracking number is very likely right after this statement.

Order detail keyword(s) that are vague and that can be used in many contexts may have a lower priority as they can lead to parsing out false positives. In the case of tracking numbers, examples of low-priority order detail keywords are "track" and/or "tracking". An example of the priority/keyword data structure for a keyword list associated with a tracking number is illustrated in Listing-1.

```
trackingKeywords = [ ]struct {
    keyword string
    priority int
} {
    {"tracking no", 1},
    {"tracking number: ", 0},
    {"track", 3},
    {"tracking number is", 0},
}
```

Listing-1

The processor 121 may implement an order detail parser 126. In some examples, the order detail parser 126 may include instructions that are executed by the processor 121.

The computing device 108 may receive an email 113. For example, an email may be sent from a vendor. The computing device 108 may receive the email 113 from an email server or an email service. Upon receiving the email 113, the processor 121 may identify the email 113 as being received from a vendor based on the email address of the sender.

The processor 121 may look for an order detail keyword in the email 113. In some examples, an email fragment generator 127 may separate the email 113 into fragments. As used herein, a "fragment" is a sub-portion of the email 113. In some examples, the email fragment generator 127 may break apart the email 113 into the fragments, where a fragment is a statement broken up by newlines. An example of an email 212 that is broken into fragments is illustrated in FIG. 2.

Figure 2:
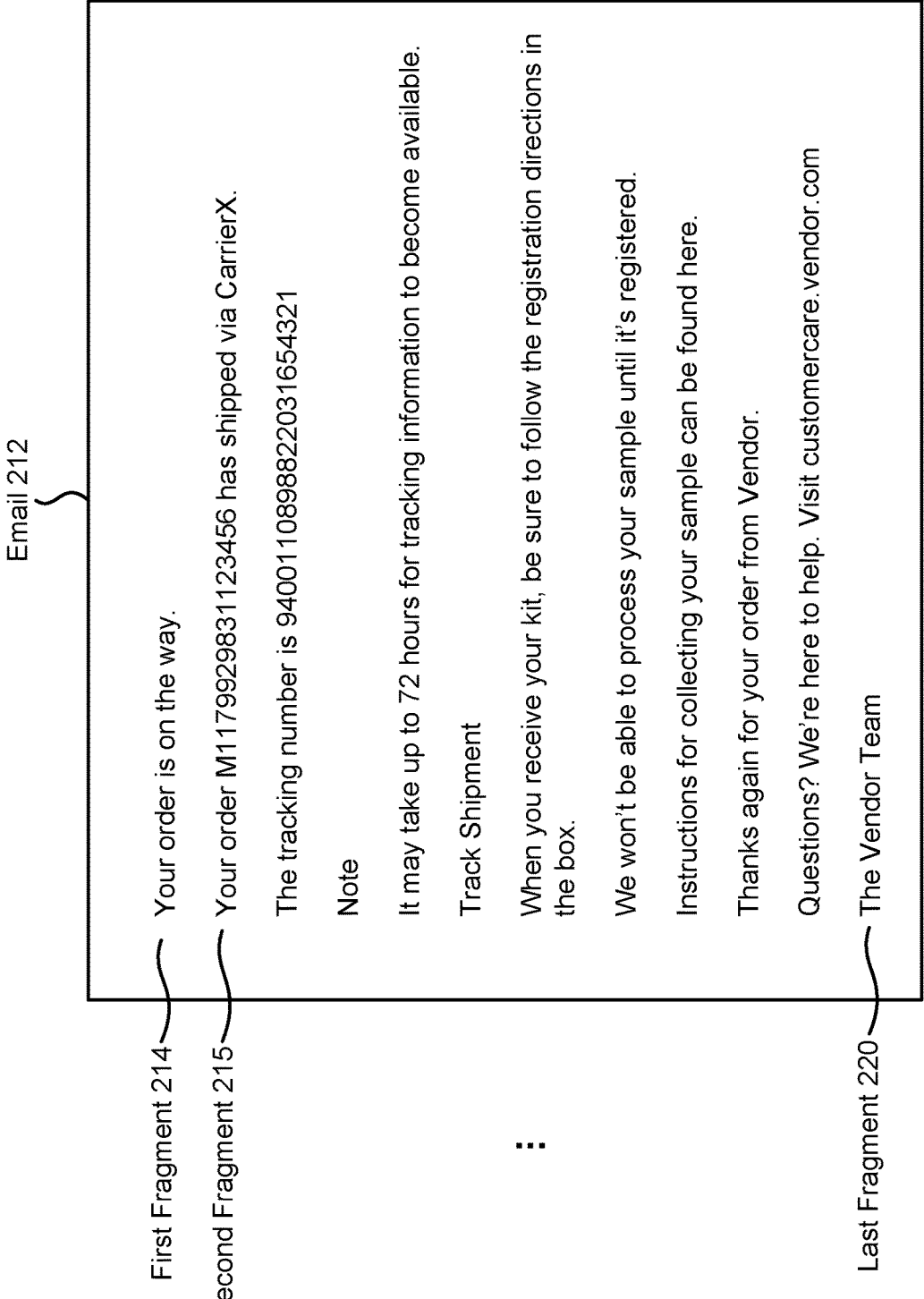
FIG. 2 is an example of an email that is broken into fragments.

Referring momentarily to FIG. 2, the email 212 includes twelve lines of text. The processor 121 (e.g., the email fragment generator 127) may generate a first fragment 214 that includes a first line of text up to a newline character. In this case, the first fragment 214 includes the phrase "Your order is on the way." A second fragment 215 includes the phrase "Your order M11799929831123456 has shipped via CarrierX." The processor 121 may proceed in this manner until the last fragment 220, which includes the phrase "The Vendor Team".

Referring again to FIG. 1, in some examples, the order detail 119 may be an alphanumeric string with a defined number of characters. For example, in the case of a tracking number, a tracking number may be considered to be an alphanumeric string that is between 10 and 34 characters long. In the case of an order number, an order number may be considered to be an alphanumeric string that is between 4 and 30 characters long.

In some examples, the processor 121 (e.g., a keyword sorter 129) may sort the keyword list 116 based on the priority values 118 of the order detail keywords 117. For example, the highest-priority order detail keywords may be placed at the beginning of the keyword list 116. An example of a sorted keyword list is illustrated in Listing-2.

```
trackingKeywords = [ ]struct {
    keyword string
    priority int
} {
    {"tracking number is", 0},
    {"tracking number:", 0},
    {"tracking no", 1},
    {"track", 3},
}
```

Listing-2

It should be noted that in Listing-2, the order detail keywords 117 with a priority value of "0" are positioned at the beginning of the keyword list "trackingKeywords." The remaining order detail keywords 117 are then sorted in descending order of priority value.

In some examples, the processor 121 (e.g., a keyword searcher 131) may search for each of the order detail keywords 117 in the fragments based on the priority values 118. For example, the processor 121 may loop through the fragments to detect order detail keywords. In some examples, in a nested loop, the processor 121 may loop through each fragment of the email. The processor 121 may convert the current fragment to lowercase letters. The processor 121 may look to see if the current order detail keyword exists in the current fragment. If a fragment contains an order detail keyword, it is very likely that an order detail is located nearby in the email.

In response to detecting an order detail keyword in a fragment, the processor 121 (e.g., an order detail searcher 133) may search for an order detail 119. In some examples, the processor 121 may look for the order detail 119 (e.g., tracking number, order number) in the fragment (fragment+1) right after the fragment containing the order detail keyword 117. If an order detail is found in fragment+1, then these steps may be repeated for the remaining fragments using the same order detail keyword.

A detected order detail 119 may be saved to memory. For example, a detected order detail 119 may be added to a list of order detail. The processor 121 may ensure that the detected order detail 119 does not already exist in the order detail list.

If the processor 121 does not find an order detail in fragment+1, then the processor 121 may look for the order detail 119 in the current fragment containing the order detail keyword 117. If an order detail is found in the current fragment, then these steps may be repeated for the remaining fragments using the same order detail keyword.

The processor 121 may continue searching the current fragment and a defined number (e.g., 2) of fragments after the current fragment for the order detail 119. If no order detail is found, then the processor 121 may move on to the next order detail keyword and repeat these steps.

Figure 3:
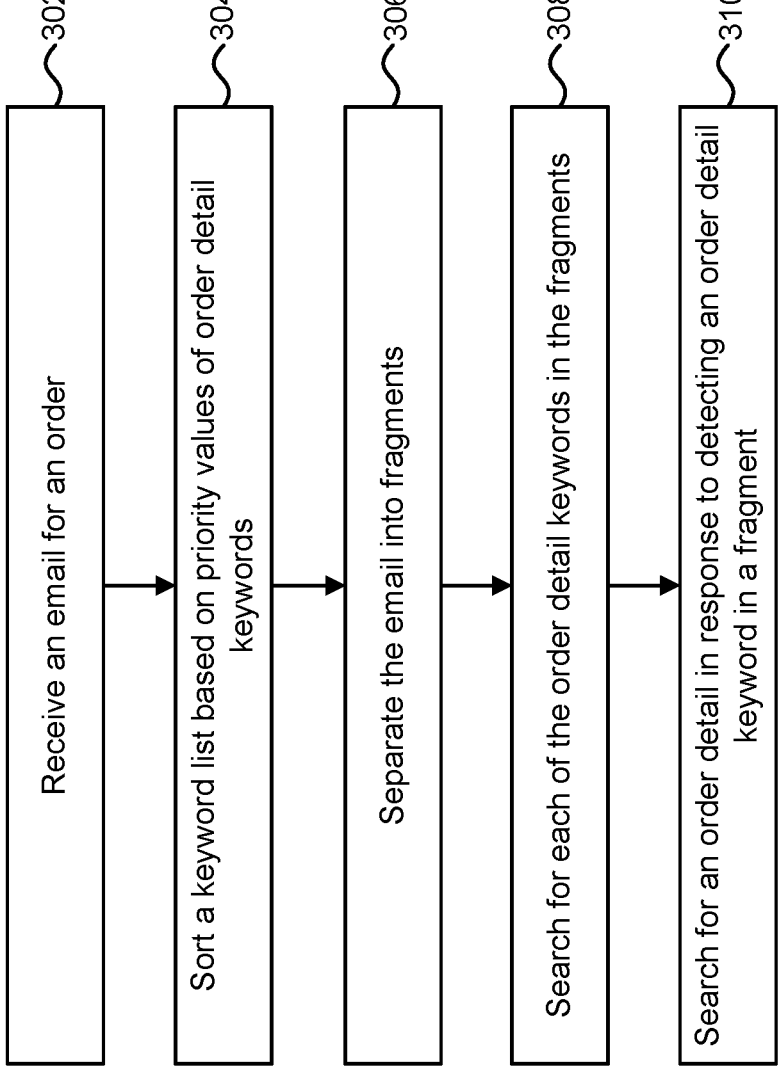
FIG. 3 is a flow diagram illustrating one example of a method by a computing device for a priority order detail keyword search.

FIG. 3 is a flow diagram illustrating one example of a method 300 by a computing device 108 for a priority order detail keyword search. The computing device 108 may receive 302 an email for an order. The computing device 108 may sort 304 a keyword list based on priority values of order detail keywords. In some examples, the order detail 119 may include a tracking number. In this case, the order detail keywords 117 may be associated with a tracking number. In some examples, the order detail 119 may include an order number, and the order detail keywords 117 may be associated with the order number.

The computing device 108 may separate 306 the email into fragments. For example, the computing device 108 may break the email into multiple parts (e.g., fragments) at newlines.

In some examples, the computing device 108 may search 308 for each of the order detail keywords 117 in the fragments based on the priority values 118. For example, the computing device 108 may convert the fragments to lowercase letters. For each order detail keyword in the keyword list 116, the computing device 108 may then loop through the fragments to determine whether an order detail keyword is present in a fragment.

In some examples, the computing device 108 may search 310 for an order detail in response to detecting an order detail keyword in a fragment. For example, the computing device 108 may detect an order detail keyword in a current fragment. The computing device 108 may search the current fragment and a defined number of fragments (e.g., fragment+1, fragment+2, and so forth) after the current fragment for the order detail 119. The computing device 108 may save the order detail 119 to memory in response to detecting the order detail 119 in the current fragment or a fragment after the current fragment.

Figure 4:
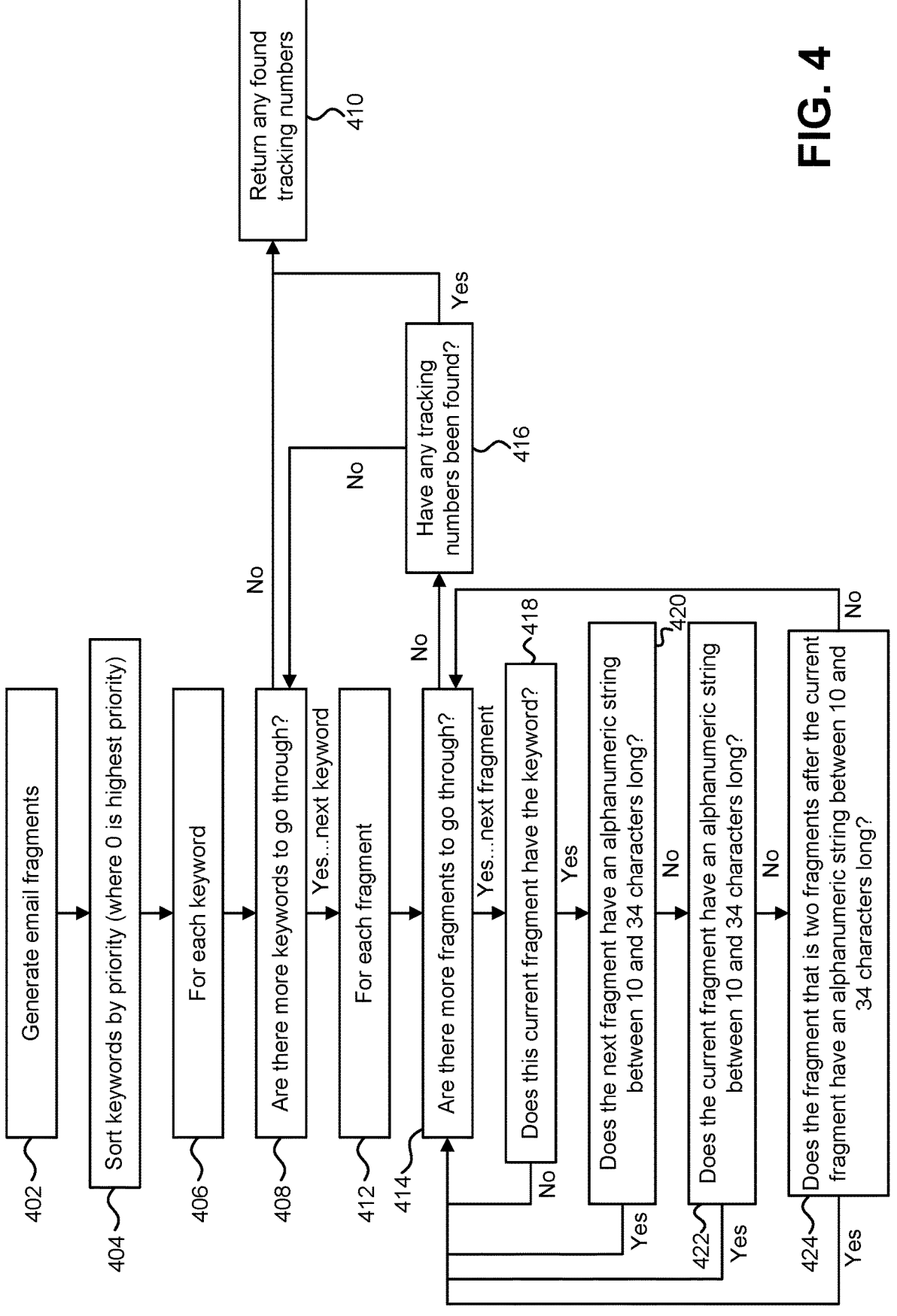
FIG. 4 is a flow diagram illustrating another example of a method by a computing device for a priority order detail keyword search.

FIG. 4 is a flow diagram illustrating another example of a method 400 by a computing device 108 for a priority order detail keyword search. In some examples, the method 400 may be implemented by an order detail parser running on the computing device 108.

In this example, the computing device 108 is searching for a tracking number in an email. Therefore, the order detail 119 is the tracking number. Furthermore, the example email 212 of FIG. 2 and the keyword list of Listing-2 are used to illustrate this method.

The computing device 108 may generate 402 a list of email fragments. For example, the email 212 may be fragmented as described in FIG. 2.

The computing device 108 may sort 404 the keyword list 116 by priority value 118. This may be accomplished as illustrated in Listing-2. In this case, a priority value of "0" is the highest priority.

The computing device 108 may loop 406, 408 through the tracking keywords in the keyword list 116. The computing device 108 may set 406 a current tracking keyword. For example, referring to Listing-2, the computing device 108 may set the current tracking keyword as "tracking number is". In a nested loop 412, 414, the computing device 108 may loop 414 through each fragment looking for the current tracking keyword (e.g., "tracking number is"). The computing device 108 may convert the current fragment to lowercase letters. For example, the computing device 108 may convert the current fragment "Your order is on the way." to "your order is on the way."

The computing device 108 may look to see if the current tracking keyword exists in the current fragment. If a fragment contains a tracking keyword, it is very likely a tracking number is near. If not, the computing device 108 may move on to the next fragment. In this case, the current fragment "your order is on the way." does not contain the current tracking keyword "tracking number is". Therefore, the computing device 108 moves on to the next fragment.

The second fragment 215 of FIG. 2 is "Your order M11799929831123456 has shipped via CarrierX." The computing device 108 may convert this fragment to lowercase letters: "your order m11799929831123456 has shipped via carrierx." The computing device 108 may then determine 418 whether the current fragment has the current tracking keyword. In this case, "your order m11799298311123456 has shipped via carrierx." does not include the tracking keyword "tracking number is". Therefore, the computing device 108 moves on to next fragment.

The third fragment of FIG. 2 is "The tracking number is 94001108988822031654321." The computing device 108 may convert this fragment to lowercase letters: "the tracking number is 94001108988822031654321." The computing device 108 may then determine 418 whether the current fragment has the current tracking keyword. In this case, "the tracking number is 94001108988822031654321." includes the tracking keyword "tracking number is".

In response to detecting the tracking keyword, the computing device 108 may determine 420 whether the next fragment (fragment+1) includes a tracking number. In this example, the computing device 108 may detect the tracking number as an alphanumeric string between 10 and 34 characters long. In this case, fragment+1 is "Note", which does not include a tracking number.

The computing device 108 may then determine 422 whether the current fragment (fragment) includes a tracking number. In this case, the current fragment is "The tracking number is 94001108988822031654321.", which includes a tracking number. The computing device 108 may determine that a tracking number has been found.

The computing device 108 may return 410 any found tracking numbers. For example, the computing device 108 may add each tracking number to the tracking number list, ensuring it does not already exist in the list.

If the computing device 108 did not find a tracking number in the current fragment, then the computing device 108 may determine 424 whether a fragment (fragment+2) that is two fragments after the current fragment has a tracking number.

Once the computing device 108 finishes searching the fragments for the current tracking keyword, the computing device 108 may determine 416 whether any tracking numbers have been found. If a tracking number has been found, then the computing device 108 may return 410 any found tracking numbers. If the computing device 108 does not find a tracking number, then the computing device 108 may go to the next tracking keyword in the keyword list 116. The computing device 108 may then search the fragments for the next tracking keyword, and so forth.

Figure 5:
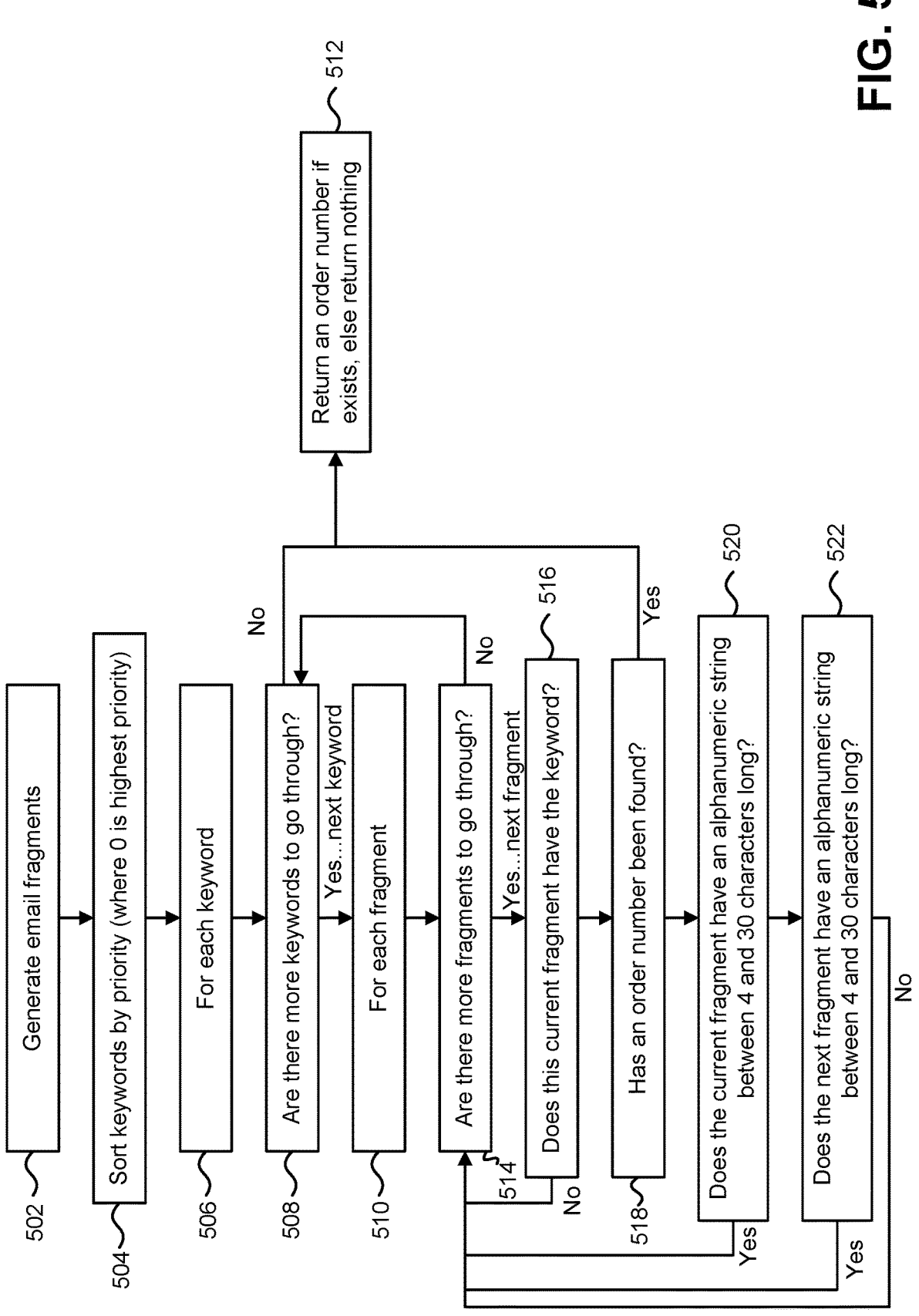
FIG. 5 is a flow diagram illustrating yet another example of a method by a computing device for a priority order detail keyword search.

FIG. 5 is a flow diagram illustrating yet another example of a method 500 by a computing device for a priority order detail keyword search. In some examples, the method 500 may be implemented by an order detail parser running on the computing device 108.

In this example, the computing device 108 is searching for an order number in an email. Therefore, the order detail 119 is the order number. Furthermore, the example email 212 of FIG. 2 is used to illustrate this method.

The computing device 108 may generate 502 a list of email fragments. For example, the email 212 may be fragmented as described in FIG. 2.

The computing device 108 may sort 504 the keyword list 116 by priority value 118. This may be accomplished as illustrated in Listing-2. However, in this example, different terms may be used for the order number keywords. For instance, order number keywords may include "order", "order number", and/or "order number is". In this case, a priority value of "0" is the highest priority.

The computing device 108 may loop 506, 508 through the order number keywords in the keyword list 116. The computing device 108 may set 506 a current order number keyword. For example, the computing device 108 may set the current order number keyword as "order". In a nested loop 510, 514, the computing device 108 may loop 510 through each fragment looking for the current order number keyword (e.g., "order"). The computing device 108 may convert the current fragment to lowercase letters. For example, the computing device 108 may convert the current fragment "Your order is on the way." to "your order is on the way."

The computing device 108 may look 516 to see if the current order number keyword exists in the current fragment. If a fragment contains an order number keyword, it is very likely an order number is near. If not, the computing device 108 may move on to the next fragment. In this case, the current fragment "your order is on the way." contains the current order number keyword "order".

In response to detecting the order number keyword, the computing device 108 may determine 518 whether the current fragment includes an order number. In this example, the computing device 108 may detect 520 the order number as an alphanumeric string between 4 and 30 characters long. In this case, the current fragment "your order is on the way." does not include an order number.

The computing device 108 may then determine 522 whether the next fragment (fragment+1) includes an order number. In this case, the next fragment is "Your order M11799298311123456 has shipped via CarrierX.", which includes an order number. The computing device 108 may determine that an order number has been found.

The computing device 108 may return 512 any found order numbers. For example, the computing device 108 may add each order number to an order number list, ensuring it does not already exist in the list.

Once the computing device 108 finishes searching the fragments for the current order number keyword, the computing device 108 may determine 518 whether any order numbers have been found. If an order number has been found, then the computing device 108 may return 512 any found order numbers. If the computing device 108 does not find an order number, then the computing device 108 may go to the next order number keyword in the keyword list 116. The computing device 108 may then search the fragments for the next order number keyword.

Figure 6:
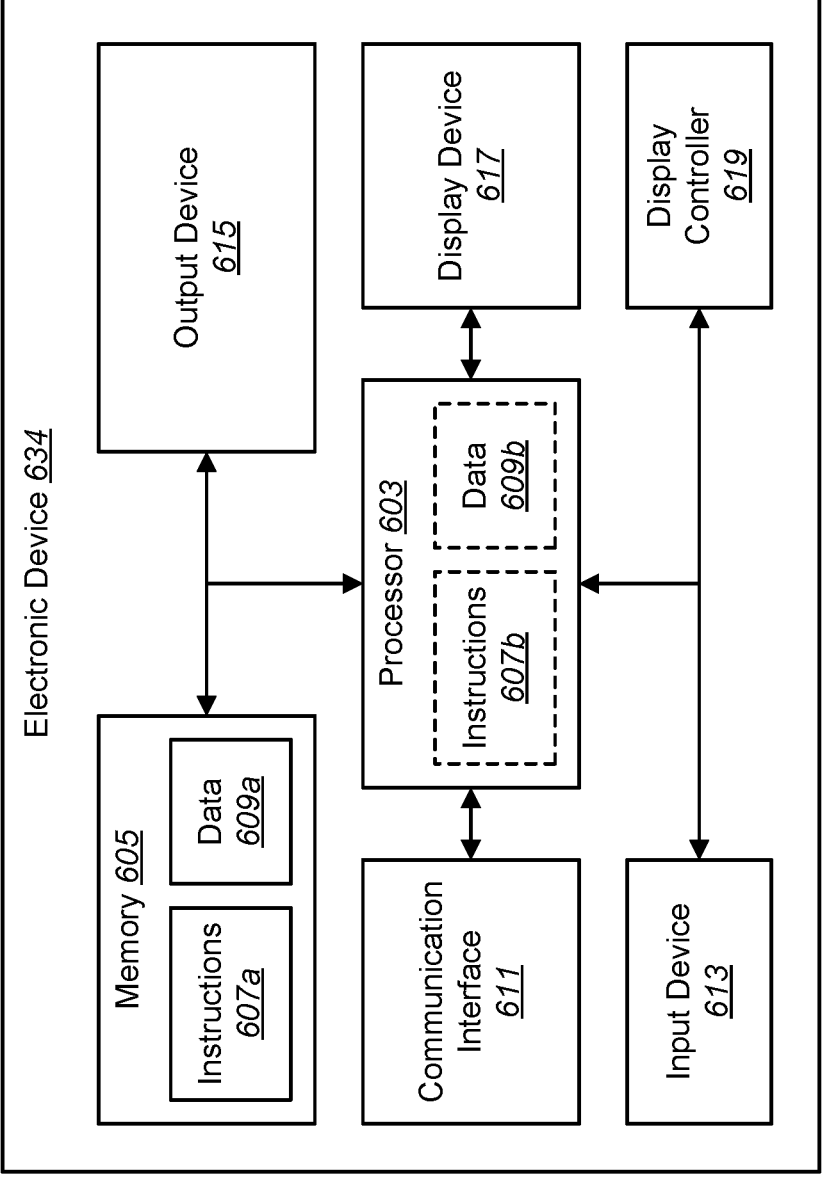
FIG. 6 illustrates various components that may be utilized in an electronic device.

FIG. 6 illustrates various components that may be utilized in an electronic device 634. The electronic device 634 may be configured in accordance with one or more of the computing device 108 or server 104 described herein.

The electronic device 634 may include a processor 603 and memory 605. The memory 605 may include instructions 607a and data 609a. The processor 603 controls the operation of the electronic device and may be, for example, a microprocessor, a microcontroller, a digital signal processor (DSP) or other device known in the art. The processor 603 typically performs logical and arithmetic operations based on program instructions 607b and/or data 609b received from the memory 605.

The electronic device 634 typically may include one or more communication interfaces 611 for communicating with other electronic devices. The communication interfaces 611 may be based on wired communication technology, wireless communication technology or both. Examples of different types of communication interfaces 611 include a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The electronic device 634 typically may include one or more input devices 613 and one or more output devices 615. Examples of different kinds of input devices 613 include a keyboard, mouse, microphone, remote control device, button, joystick, trackball, touchpad, lightpen, etc. Examples of different kinds of output devices 615 include a speaker, printer, etc. One specific type of output device 615 that may be included in a computer system is a display device 617. Display devices 617 used with configurations disclosed herein may utilize any suitable image projection technology, such as liquid crystal display (LCD), light-emitting diode (LED), gas plasma, electroluminescence, a cathode ray tube (CRT) or the like.

A display controller 619 may also be provided, for converting data 609a stored in the memory 605 into text, graphics and/or moving images (as appropriate) shown on the display device 617. Of course, FIG. 6 illustrates only one possible configuration of an electronic device 634. Various other architectures and components may be utilized.

The systems and methods for a priority order detail keyword search as described above may be used with various systems with implementations that may vary depending on the requirements of the system. Examples of such systems are shown and described below in relation to FIGS. 7, 8A, 8B and 8C. The systems and methods for a priority order detail keyword search as described above may be used in combination with a system for managing user transactions, which may include client computing devices configured to display an interface configured to visually represent transactions corresponding to a plurality of different vendors and/or a plurality of different carriers, as disclosed below.

The systems and methods for a priority order detail keyword search may be implemented by services or programs running on the transaction platform 110, the acquisition engine 120 or any of the modules described in relation to FIGS. 7, 8A, 8B and 8C.

Figures 7, 8A:
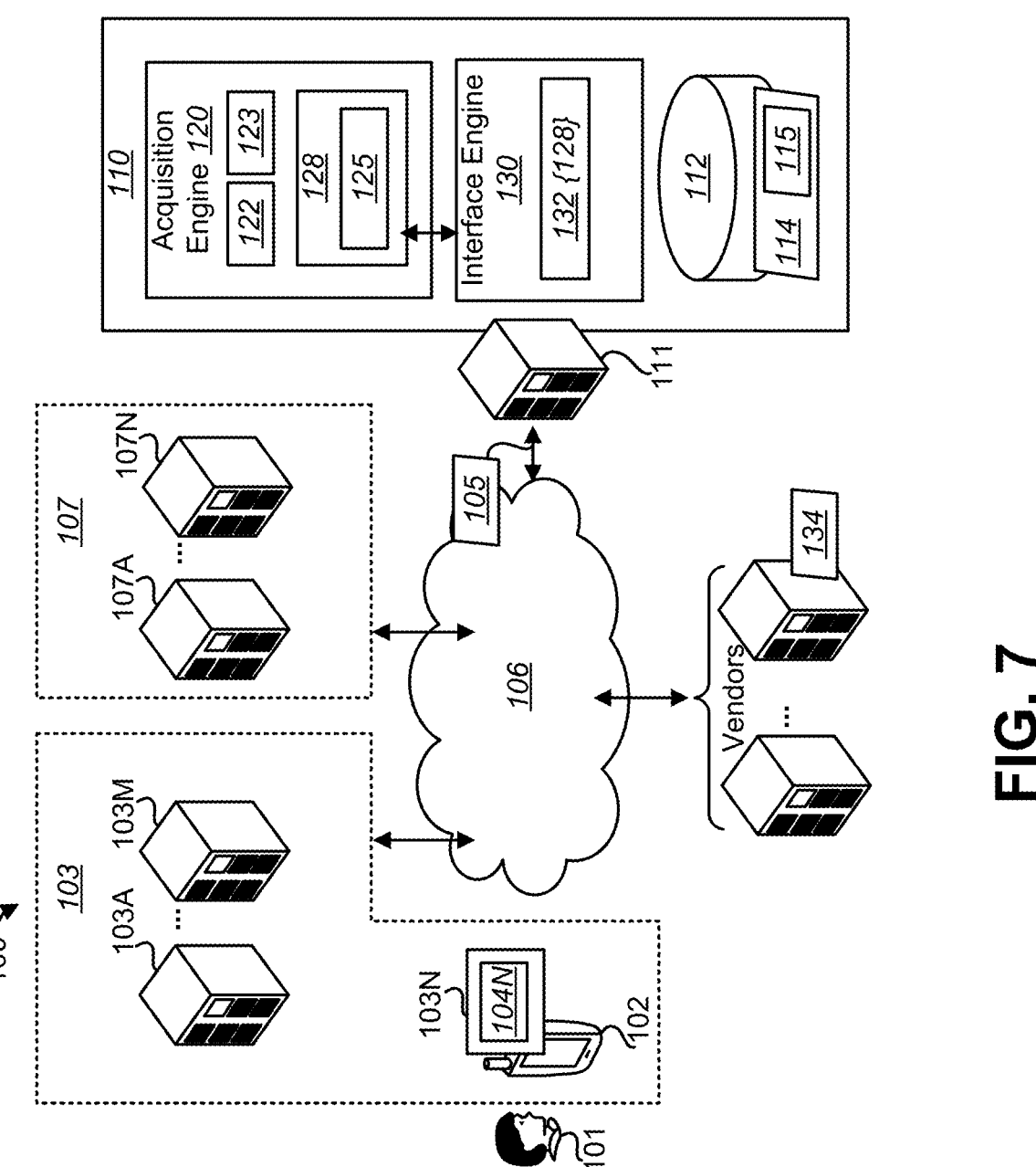
FIG. 7 is a schematic block diagram of one example of a system for managing user transactions.
FIG. 8A is a schematic block diagram of one example of a client computing device configured to display an interface configured to visually represent transactions corresponding to a plurality of different vendors and/or a plurality of different carriers.

FIG. 7 is a schematic block diagram illustrating one example of a system 100 for aggregating, managing, and/or visualizing transactions spanning a plurality of different vendors and/or carriers, as disclosed herein. The system 100 may comprise a transaction aggregation, management and/or visualization platform (transaction platform 110). The transaction platform 110 may comprise a network-accessible service comprising and/or embodied by one or more computing systems, such as a computing system 111. The computing system 111 may comprise one or more computing devices (e.g., one or more server computing devices, rack mounted computing devices, blade computing devices, clustered computing devices, and/or the like). Portions of the transaction service 110 (and/or services, systems, modules, agents, engines, methods, processes and/or operations disclosed herein) may comprise and/or be embodied by hardware computing resources of the computing system 111, which may include, but are not limited to: processing resources (e.g., a processor, a general-purpose processor, an application-specific processor, an Application-Specific Integrated Circuit (ASIC), a Field Programmable Gate Array (FPGA)), memory resources (e.g., volatile memory resources, random access memory (RAM), dynamic RAM, static RAM, persistent memory, battery-backed RAM, and/or the like), nontransitory storage resources (e.g., a hard drive, solid-state storage device, local storage device, network-attached storage system, and/or the like), network interface resources (e.g., a network interface device, a network interface card, and/or the like), and so on (not shown in FIG. 7 to avoid obscuring details of the illustrated examples).

The transaction platform 110 may comprise and/or be operatively coupled to a data store 112. The data store 112 may comprise any suitable means for persistently storing, maintaining, manipulating, and/or retrieving data, including, but not limited to one or more: storage devices, local storage devices, remote storage devices (e.g., network attached storage devices), hard disk drives, solid-state storage devices, data management systems, databases, and/or the like. As used herein, "data" refers to electronically encoded information corresponding to any suitable format, encoding, representation, and/or structure. In some examples, the transaction platform 110 (and/or portions thereof) may be embodied as computer-readable instructions stored on the data store 112, the computer-readable instructions configured to cause the computing system 111 to implement operations for aggregating, managing, and/or visualizing user transaction data, as disclosed herein.

The transaction platform 110 may be communicatively coupled to an electronic communication network (network 106). The network 106 may comprise any suitable means for electronic communication, including, but not limited to: an Internet Protocol (IP) network, the Internet, a wireless network, a Local Area Network (LAN), a Wide Area Network (WAN), a Virtual Private Network (VPN), a wireless network (e.g., IEEE 802.11a-n wireless network, Bluetooth® network, Near-Field Communication (NFC) network, and/or the like), a public switched telephone network (PSTN), a mobile network (e.g., a network configured to implement one or more technical standards or communication methods for mobile data communication, such as Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), High Speed Uplink Packet Access (HSUPA), Long Term Evolution (LTE), LTE-A (Long Term Evolution-Advanced), and/or the like), a combination of networks, and/or the like.

The transaction platform 110 may comprise an acquisition engine 120 configured to retrieve information pertaining to user transactions (and/or transaction shipments) from one or more data sources, which, as disclosed in further detail herein, may comprise transaction data sources 103, shipment data sources 107, vendor data sources, and/or the like. The platform 110 may further comprise an interface engine 130 configured to, inter alia, generate interfaces configured to display visual representations of user transactions (and/or transaction shipments) pertaining to a plurality of different vendors and/or a plurality of different carriers. The interfaces may provide for managing and/or visualizing user transactions, as disclosed herein. In some examples, the interface engine 130 is configured to provide interfaces capable of displaying a visualization representation of a plurality of different transactions and/or a plurality of different transaction shipments that span a plurality of different vendors and/or different carriers within a single, unified map-based interface.

The acquisition engine 120 may be configured to obtain information pertaining to transactions involving respective users 101 of the transaction platform 110, extract information pertaining to respective transactions involving the users (transaction data), acquire shipment status information pertaining to transaction shipments, aggregate and/or combine the transaction data, and so on. As used herein, a "user" (a user 101) may refer to one or more of an individual, a group, an entity, an organization, a corporation, a partnership, and/or the like. A user 101 may be represented by a user record 114, which may be embodied as electronically encoded information maintained on non-transitory storage of the transaction platform 110 (e.g., within the data store 112). The transaction platform 110 may be configured to request registration information pertaining to a user 101, receive the registration information, and record the registration information within a corresponding user record 114. The transaction platform 110 may be further configured to secure user records 114 (and corresponding information pertaining to the user 101), which may comprise encrypting data transmitted on the network 106 (e.g., encrypt registration data during transport from a client computing device 102 to the transaction platform 110), encrypting data received at the transaction platform 110 (e.g., encrypting user records 114 stored within the data store 112), controlling access to user records 114, and so on.

A user record 114 may comprise any suitable information pertaining to a user 101, including, but not limited to: an identifier, contact information (e.g., email address, instant messaging address, phone number, and/or the like), preferences, settings, profile information, and/or the like. The user 101 may enter into transactions with one or more vendors. In some examples, the user 101 may enter into transactions through ecommerce platforms of one or more vendors (through network-accessible services, systems, and/or platforms configured to facilitate transactions, such as an on-line store, automated ordering system, and/or the like). As disclosed in further detail herein, information pertaining to transactions of the user 101 may be maintained within and/or accessible from one or more network-accessible data sources. As used herein, a network accessible data source refers to a system, service, and/or platform configured to maintain and/or provide access to information pertaining to transactions and/or transaction shipments involving the user 101.

In the FIG. 7 example, information pertaining to transactions between the user 101 and one or more vendors may be maintained by and/or accessible from one or more transaction data sources 103A-N. A transaction data source 103 may comprise a service configured to receive, maintain, and/or provide access to messages pertaining to user transactions with one or more vendors. A transaction data source 103 may include, but is not limited to: an email system, messaging service, instant messaging service, text messaging service, transaction management system, account management system, a banking system, an accounting system, an ecommerce system, a storefront, and/or the like. A transaction data source 103 may comprise an account at which the user 101 receives messages pertaining to transactions corresponding to one or more vendors (e.g., may comprise an email account to which the one or more vendors are configured to send order, shipping, delivery, and/or other messages pertaining transactions therewith). Alternatively, or in addition, a transaction data source 103 may comprise and/or correspond to an ecommerce system through which the user 101 performs transactions (e.g., a transaction data source 103 may comprise a network accessible service of a vendor). Although particular examples of transaction data sources 103 are described herein, the disclosure is not limited in this regard and could be adapted for integration with any suitable means for obtaining information pertaining to user transactions, as disclosed herein. Moreover, although FIG. 7 depicts the transaction data sources 103 and vendors as separate entities, the disclosure is not limited in this regard and could be adapted for use in configurations in which user transaction information is maintained by and/or accessible through transaction data sources 103 managed by respective vendors, and/or the like (e.g., in some examples, a transaction data source 103 may correspond to a network-accessible service of a vendor, or vice versa).

A user record 114 may further comprise and/or reference data pertaining to data sources associated with the user 101 (access data 115). The access data 115 registered by a user 101 for a particular data source may be configured to enable the acquisition engine 120 to access and/or extract information pertaining to transactions involving the user 101 therefrom. The access data 115 registered for a transaction data source 103 may comprise any suitable information, including, but not limited to: an identifier (e.g., a name, label, and/or other identifier associated with the transaction data source 103), access information (e.g., a network address, network port, Uniform Resource Identifier (URI), Uniform Resource Locator (URL), or other address information by which the transaction data source 103 may be accessed), access protocol information (e.g., an Application Programming Interface (API), a query and/or access mechanism supported by the transaction data source 103, such as Structured Query Language (SQL), Simple Object Access Protocol (SOAP), and/or the like), an identifier of the user 101 at the transaction data source 103 (e.g., a user name, a user identifier, an account name, an account identifier, an email address, and/or other identifier by which the user 101 is identified at the transaction data source 103), authentication data to enable the acquisition engine 120 to authenticate to and/or securely access data pertaining to the user 101 at the transaction data source 103 (e.g., an authentication credential, a token, a password, a password hash, a key, a public key, a private key, a signature, and/or the like), and so on. In one example, first access data 115 registered by a user 101 may be configured to enable the acquisition engine 120 to access a first email account of the user 101 managed by a first transaction data source 103, second access data 115 registered by the user 101 may be configured to enable the acquisition engine 120 to access a second email account of the user 101 managed by a second transaction data source 103, third access data 115 may be configured to enable the acquisition engine 120 to access text messages of the user 101 managed by a third transaction data source 103, fourth access data 115 may be configured to enable the acquisition engine 120 to access an account of the user 101 with a specified vendor managed by a fourth transaction data source 103, and so on.

The acquisition engine 120 may use the access data 115 to obtain data pertaining to user transactions and/or corresponding transaction shipments (raw data transaction and/or shipment data 105). As used herein, raw transaction and/or shipment (RTS) data 105 refers to any data pertaining to a user transaction and/or transaction shipment, including, but not limited to: data pertaining to respective transactions involving the user maintained by and/or within more transaction data sources 103, data pertaining to the status of transaction shipments maintained by and/or within one or more shipment data sources 107, and/or the like. RTS data 105 may be accessed from a plurality of different data sources, each configured to maintain and/or provide access to transaction data in accordance with a respective configuration. Accordingly, RTS data 105 acquired from different data sources (e.g., different transaction and/or shipping data sources 103 and/or 107) may correspond to different respective configurations (e.g., different respective layouts, structures, schemas, encodings, formats, representations, namespaces, access protocols, and/or the like). As disclosed in further detail herein, the acquisition engine 120 may be configured to acquire information pertaining to transactions involving the user 101 (e.g., transaction data). The acquisition engine 120 may be configured to import RTS data 105 from a plurality of different data sources in accordance with different configurations, which may comprise transforming the RTS data 105 from each of a plurality of different configurations into a uniform configuration. The acquisition engine 120 may be further configured to maintain RTS data 105 acquired from different data sources (and/or having different configurations) in uniform data structures (e.g., transaction records 125). In some examples, the acquisition engine 120 is configured to extract, import, and/or maintain transaction records 125, each transaction record 125 comprising information pertaining to a respective transaction involving the user 101. A transaction record 125 may comprise any suitable information pertaining to a transaction, including, but not limited to: a vendor identifier (e.g., an identifier corresponding to the vendor associated with the transaction, such as a vendor name, vendor address, vendor URI, vendor URL and/or the like), a vendor transaction identifier (VTI) (an vendor-specific identifier assigned to the transaction by the vendor, such as an order number, invoice number, transaction URI, transaction URL, and/or the like), a transaction identifier (e.g., an identifier configured to uniquely identify the transaction record 125 and/or transaction represented thereby within the transaction platform 110, may comprise a combination of a vendor-specific identifiers, such as the vendor identifier and/or vendor transaction identifier, as disclosed in further detail herein), items purchased by the user 101 in the transaction (e.g., item name, Uniform Product Code (UPC), item options, item price, item quantity, URI of the item at the vendor, URL of the item at the vendor, and/or the like), information pertaining to the value of the transaction (e.g., item cost, taxes, shipping cost, insurance cost, and/or the like), receipts (e.g., information pertaining to payments remitted to the vendor pursuant to the transaction, and/or the like), information pertaining to insurance covering the transaction (if any), transaction status information (e.g., an indicator of whether the transaction is pending, in process, completed, and/or the like), and so on. A transaction record 125 may further comprise information pertaining to shipments associated with the transaction (e.g., information pertaining to transaction shipments comprising items purchased in the transaction). The information pertaining to a transaction shipment acquired from a transaction data source 103 may include, but is not limited to: an identifier of the carrier assigned to handle the shipment (e.g., a name, label, identifier, URI, URL, or other identifying information pertaining to the carrier), a shipment identifier (e.g., a identifier configured to identify the shipment at the carrier and/or access status information pertaining to the shipment, such as a tracking number, confirmation number, delivery confirmation number, and/or the like), shipment status information, and so on. In some examples, a transaction record 125 may comprise information pertaining to a plurality of transaction shipments, each representing a respective shipment associated with the transaction (e.g., a shipment comprising respective items purchased in the transaction).

In the FIG. 7 example, the acquisition engine 120 may be configured to obtain data pertaining to transactions involving the user 101 (RTS data 105) from a plurality of transaction data sources 103A-N. Transaction data sources 103A-M may comprise third-party network-accessible systems (e.g., email systems, messaging platforms, and/or the like). The acquisition engine 120 may be further configured to obtain user transaction data from one or more "local" transaction data sources 103. As used herein, a local transaction data source 103 refers to a transaction data source 103 corresponding to a particular user 101 (and/or client computing device 102 of the user 101). In the FIG. 7 example, the acquisition engine 120 may be configured to obtain RTS data 105 from transaction data source 103N, which may comprise and/or correspond to a client computing device 102 of the user 101. The transaction data source 103N may comprise data associated with one or more other transaction data sources 103A-M (e.g., may comprise data cached on the client computing device 102, such as one or more email messages corresponding to an email account of the user 101 managed by another one of the transaction data sources 103A-M). Alternatively, or in addition, the transaction data source 103N may comprise data produced and/or maintained on the client computing device 102, such as data pertaining to transactions executed by the user 101 on the computing device 102.

In some examples, a transaction data source 103 may be configured to maintain information pertaining to the user 101 in one or more data records. As used herein, a data record may comprise any suitable collection of electronically encoded information, including, but not limited to: a message, an email message, an instant message, a text message, a data structure, unstructured data (e.g., a data blob), an object, a data record, a transaction record, a database record, JavaScript Object Notation (JSON) data, HyperText Markup Language (HTML) data, extensible Markup Language (XML) data, and/or the like. The acquisition engine 120 may be configured to: access data records maintained by respective data sources (e.g., transaction data sources 103A-N), identify information pertaining to transactions involving the user 101 within one or more of the accessed data records, extract RTS data 105 from the identified data records, and import the RTS data 105 into the transaction platform 110. The acquisition engine 120 may access data records managed by a data source (e.g., transaction data source 103) using any suitable means including, but not limited to: requesting data records from the data source (e.g., sending requests to the data source through the network 106), querying the data source (e.g., submitting queries to the data source through the network 106), utilizing a data access interface provided by the data source (e.g., a data access API), searching the data source, reading data records and/or metadata from a storage system associated with the data source, and/or the like. Identifying information pertaining to a user transaction within a data record may comprise interpreting, searching, parsing, and/or analyzing the data record. The extracting may comprise retrieving RTS data 105 corresponding to the identified information pertaining to the user transaction from the data record. Importing the RTS data 105 may comprise incorporating the RTS data 105 into one or more transaction records 125. The importing may comprise generating one or more transaction records 125, updating one or more transaction records 125, and/or the like.

In some examples, the acquisition engine 120 may be configured to identify and/or extract RTS data 105 from a transaction data source 103 using a set of pre-determined extraction rules 122. The extraction rules 122 may comprise any suitable means for accessing, identifying and/or extracting electronically encoded information from a transaction data source 103 and/or data record(s) managed thereby. The extraction rules 122 may comprise and/or be embodied by computer-readable instructions, configuration data, classification data, classification criteria, and/or the like. The extraction rules 122 may comprise filter criteria configured to identify data records, of a plurality of data records, that comprise (or are likely to comprise) information pertaining to a user transaction. The extraction rules 122 may be further configured to distinguish and/or exclude data records that do not comprise (or are unlikely to comprise) information related to user transactions. The extraction rules 122 may further comprise parsing instructions configured to enable the acquisition engine 120 to interpret data managed by respective data sources (e.g., data records), identify RTS data 105 therein, and/or extract the identified RTS data 105. An extraction rule 122 may specify keywords, phrases, terms, and/or patterns that are indicative of user transaction data (e.g., keywords, phrases, terms, and/or patterns in the title, subject line, body, and/or metadata of email messages that relate to user transactions). By way of non-limiting example, an extraction rule 122 may specify that email messages having a subject line of "order confirmation" or "shipment notification" (or are from an address corresponding to a particular pattern, such as "orders@vendor.com") comprise transaction data, and may further specify location(s) within the data record from which corresponding RTS data 105 may be extracted therefrom. Alternatively, or in addition, one or more of the extraction rules 122 may correspond to a machine learning classifier, such as a Bayesian classifier, a neural network, and/or the like. The extraction rule 122 may be configured to classify data records as transaction related or non-transaction related (and/or classify data records as comprising particular types of transaction data and/or as comprising transaction data at specified locations). In some examples, the extraction rules 122 may be configured to identify and/or parse data records corresponding to particular transaction types and/or transactions pertaining to particular vendors. By way of further non-limiting examples, a first extraction rule 122 may be configured to identify and extract RTS data 105 from data records (e.g., email messages) associated with a first vendor, a second extraction rule 122 may be configured to identify and extract RTS data 105 from data records (e.g., email messages) associated with a second vendor, and a third extraction rule 122 may be configured to identify and extract RTS data 105 from data records accessed directly from a specified vendor (through an API provided by the specified vendor). Although particular examples of extraction rules 122 are described herein, the disclosure is not limited in this regard and could be adapted to utilize any suitable means for identifying and/or extracting RTS data 105 from electronically encoded information (e.g., data records maintained by and/or accessed from respective transaction data sources 103).

As disclosed above, each data source (e.g., each transaction data source 103A-N) may be configured to maintain data pertaining to user transactions in accordance with a respective configuration (e.g., a respective layout, structure, schema, encoding, format, representation, namespace, and/or the like), and may make such data records accessible in accordance with a respective protocol (e.g., a specified data access mechanism, API, query language, and/or the like). Accordingly, the acquisition engine 120 may be configured to access transaction data in accordance with a plurality of different protocols, and extract RTS data 105 corresponding to a plurality of different configurations.

In some examples, the acquisition engine 120 may comprise and/or be communicatively coupled to an integration module 123, which may comprise and/or be embodied by computer-readable instructions (and/or other configuration data) configured to enable the acquisition engine 120 to import transaction data from a plurality of different data sources. The integration module 123 may enable the acquisition engine 120 to: access, query, and/or retrieve data managed by a plurality of different data sources (in accordance with different data access protocols supported by the respective data sources, as disclosed herein); interpret, parse, and/or analyze data corresponding to a plurality of different configurations; identify, retrieve, and/or extract RTS data 105, and incorporate the extracted RTS data 105 into the transaction platform 110.

As disclosed above, data sources may be configured to manage data in accordance with respective configurations (native configurations). The native configuration of a data source may define one or more of a layout, structure, schema, encoding, format, representation, namespace, and/or other aspects of data accessed, queried, retrieved, and/or extracted therefrom. Accordingly, extracting data from different data sources may comprise accessing, querying, retrieving, interpreting, parsing, analyzing, and/or extracting data in accordance with different native configurations of the different data sources, and RTS data 105 extracted from the different data sources may correspond to the native configurations of the respective data sources (e.g., RTS data 105 extracted from a first data source may comprise data corresponding to a first configuration and RTS data 105 extracted from a second data source may comprise data corresponding to a second configuration, different from the first configuration). The integration module 123 may be configured to interpret data managed by a plurality of different data sources (in accordance with different respective configurations). The integration module 123 may be further configured to reconfigure native RTS data IOS, which may comprise converting the RTS data 105 from a native configuration to a target configuration. The target configuration may comprise a uniform configuration for information pertaining to respective transactions, which may be adapted to represent transactions corresponding to a plurality of different vendors, associated with transaction shipments handled by a plurality of different carriers, and comprising data (RTS data 105) corresponding to a plurality of different configurations and/or extracted from a plurality of different data sources in accordance with a plurality of different access protocols. As disclosed in further detail herein, the target configuration may comprise and/or correspond to a target namespace, which may comprise a uniform namespace configured to encompass a plurality of local or native namespaces (e.g., namespaces corresponding to respective vendors, carriers, data sources, and/or the like). In the FIG. 7 example, the target configuration may correspond to and/or be defined by a configuration of the transaction records 125 maintained by the acquisition engine 120, and the target namespace may correspond to identifying information assigned to and/or associated with the respective transaction records 125 (e.g., transaction and/or shipment identifiers assigned to respective transaction records 125 and/or transaction shipments). Transforming data from a native configuration to the target configuration may comprise performing one or more operations, which may include, but not limited to: remapping operations, manipulation operations, derivation operations, normalization operations, and/or the like. Remapping operations may comprise remapping selected elements and/or fields of native data (RTS data 105) to a uniform set of elements and/or fields of the target configuration (e.g., elements and/or fields of a transaction record 125). Remapping may comprise assigning uniform and/or normalized names, labels, and/or other semantic metadata to respective fields (columns or attributes). Manipulation operations may comprise manipulating respective fields, entries, and/or elements of the native data. A manipulation operation may pertain to one or more fields (columns or attributes) of the native data, and may comprise: adding, removing, splitting, joining, and/or otherwise manipulating the one or more fields. Alternatively, or in addition, a manipulation operation may pertain to one or more entries (rows or tuples) of the native data, and may comprise aggregating, combining, splitting and/or otherwise manipulating the one or more entries. In some examples, a manipulation operation may pertain to one or more elements of the native data (data values), and may comprise scaling, converting, transacting, transforming, replacing, and/or otherwise manipulating the one or more elements. Derivation operations may comprise deriving data corresponding to the native data, which may comprise performing calculations incorporating one or more fields (columns or attributes), entries (rows or tuples), elements (data values), and/or the like. A derivation operation may comprise deriving data for a new field (a new column or attribute), an existing field, a combination of fields, an existing entry, a combination of entries, and/or the like.

Normalization operations may comprise manipulating the structure and/or contents of the native data (e.g., identifiers, fields, and/or elements, and/or the like), such that the resulting data may be referenced, queried, and/or managed in accordance with uniform identifiers, fields, and/or elements (may be maintained within uniform transaction records 125). Normalization operations may further comprise translating RTS data 105 from one or more local or native names paces to a uniform namespace. The uniform namespace may correspond to the transaction records 125 maintained within the transaction platform 110, which may comprise RTS data 105 pertaining to transactions corresponding to a plurality of different vendors and/or transaction shipments being handled by a plurality of different carriers, which may be accessed and/or extracted from a plurality of different data sources in accordance with a plurality of different protocols and/or configurations. The transaction records 125 maintained by the acquisition engine 120 may, therefore, comprise information pertaining to a plurality of different namespaces (native or local namespaces). As used herein, "native" or "local" namespaces refer to namespaces associated with RTS data 105 accessed, extracted, and/or imported into the transaction platform 110, as disclosed herein, which may include, but are not limited to: a plurality of data source namespaces (namespaces corresponding to respective data sources), a plurality of vendor namespaces (namespaces corresponding to respective vendors), a plurality of carrier namespaces (namespaces corresponding to respective carriers), and/or the like. RTS data 105 pertaining to a transaction between a user 101 and a particular vendor (and/or a transaction shipment being handled by a specified carrier) may correspond to the native namespace of the particular vendor, the specified carrier, the data source from which the RTS data 105 was extracted, and/or the like; RTS data 105 may comprise: a VTI corresponding to the namespace of the particular vendor (an identifier assigned to a transaction by the particular vendor and by which the particular vendor references the transaction, e.g., a vendor transaction identifier, as disclosed herein), a vendor-specific user name (an name or other identifier by which the particular vendor references the user 101, which may differ from an identifier used to reference the user 101 within the transaction platform 110), a carrier shipment identifier (CSI) (an identifier assigned to the shipment by the carrier and by which the carrier tracks the shipment and/or provides access to status data pertaining to the shipment), a carrier-specific receiver name (e.g., an identifier assigned to the receiver of the shipment, which may differ from a name and/or identifier of the user 101 within the transaction platform 110), and/or the like.

As disclosed above, importing RTS data 105 may comprise implementing normalization operations to translate the RTS data 105 from one or more of a plurality of different native namespaces into the uniform namespace corresponding to the transaction records 125 maintained within the transaction platform 110. The normalization operations may comprise translating native data from one or more native namespaces into the uniform namespace (and/or deriving identifying information corresponding to the uniform namespace from identifying information of the RTS data 105, such as names, qualified names, identifiers, and/or the like). The normalization operations may, therefore, comprise associating RTS data 105 with global or uniform identifying information. As used herein, "global" or "uniform" identifying information refers to names, qualified names, identifiers, and/or other identifying information corresponding to the uniform namespace (e.g., capable of being identified, referenced, queried, searched, indexed, and/or managed 22 within the uniform namespace). In some examples, the normalization operations may comprise determining uniform transaction identifiers (transaction identifiers) from information corresponding to a vendor-specific native namespace. The normalization operations may comprise determining a transaction identifier corresponding to the uniform namespace from a combination of a vendor-specific VTI and another identifier. In some examples, determining transaction identifiers for RTS data 105 pertaining to transactions corresponding to respective vendors may comprise combining VTI assigned by the respective vendors with identifiers of the respective vendors. The normalization operations may further comprise determining uniform shipment identifiers (shipment identifiers) from information corresponding to a carrier-specific native namespace (e.g., generating shipment identifiers by, inter alia, combining (SI assigned by respective carriers with identifiers of the respective carriers). The normalizing may, therefore, comprise translating RTS data 105 from a plurality of different native namespaces into a uniform namespace, which may comprise associating RTS data 105 (and/or corresponding transaction records 125) with global and/or uniform identifiers corresponding to the uniform namespace by use of identifiers corresponding to a plurality of different native names paces (e.g., vendor, carrier, and/or data store namespaces).

Normalizing RTS data 105 may further comprise determining whether the RTS data 105 corresponds to an existing transaction record 125 using one or more uniform identifiers associated therewith. The determining may comprise associating the RTS data 105 with a uniform transaction identifier (a transaction identifier derived from a VTI included in the RTS data 105 and/or one or more other identifiers associated with the corresponding vendor), and determining whether an existing transaction record 125 comprises the uniform transaction identifier. Alternatively, or in addition, the determining may comprise associating the RTS data 105 with a uniform shipment identifier (a shipment identifier derived from a (SI included in the RTS data 105 and/or one or more other identifiers associated with the corresponding carrier), and searching for an existing transaction record 125 (and/or transaction shipment) comprising the uniform transaction identifier. In response to determining that the RTS data 105 corresponds to an existing transaction record 125 (and/or transaction shipment), the RTS data 105 may be incorporated therein (e.g., may be incorporated into and/or used to update the existing transaction record 125 and/or transaction shipment). In response to determining that the RTS data 105 does not correspond to an existing transaction record 125, the acquisition engine 120 may generate a new transaction record 125 (and/or transaction shipment), and incorporate the RTS data 105 therein, which may comprise one or more of: associating the new transaction record 125 with the unique transaction identifier, associating the transaction shipment with the unique shipment identifier, and/or the like. The namespace normalization operations disclosed herein may, therefore, prevent creation of duplicate transaction records 125, and/or enable transaction records 125 comprising RTS data 105 corresponding to a plurality of different native namespaces (e.g., different data source, vendor, and/or carrier namespaces) to be identified, referenced, queried, searched, accessed, and/or otherwise managed within a same, uniform namespace.

In some examples, the integration module 123 may be configured to implement data transforms in accordance with pre-determined integration rules, which may comprise and/or correspond to one or more of the extraction rules 122, as disclosed herein (not separately shown in FIG. 7 to avoid obscuring details of the illustrated examples). The integration rules may define remapping, normalization, transform, derivation, and/or other operations for accessing, extracting, and/or importing RTS data 105 from each of a plurality of data sources, each data source having a different respective native configuration. The integration rules may comprise and/or be embodied by respective integration components (e.g., libraries, computer-readable instructions, and/or the like) stored on a non-transitory storage medium, each integration component configured for integration with a respective data source and/or data source type (e.g., each configured to access, interpret, extract, and/or incorporate RTS data 105 in accordance with a respective access protocol and/or configuration).

In some examples, the acquisition engine 120 may be configured to monitor one or more data sources (e.g., one or more of the transaction data sources 103A-N). The monitoring may comprise accessing respective transaction data sources 103A-N (querying and/or retrieving data records therefrom), interpreting the accessed data (identifying data pertaining to user transactions), extracting RTS data 105 pertaining to the user transactions, and importing the RTS data 105 into the transaction platform 110, as disclosed herein. The acquisition engine 120 may be configured to monitor one or more of the transaction data sources 103A-M periodically (e.g., once every T hours or days). Alternatively, or in addition, the acquisition engine 120 may be configured to monitor the transaction data sources 103A-M continuously and/or in response to update requests (e.g., requests from the user 101). In some examples, the acquisition engine 120 may be configured to receive RTS data 105 "pushed" from one or more data sources. The acquisition engine 120 may be configured to subscribe to receive updates published by one or more transaction data sources 103A-N, which may be configured to push data updates to subscribers in response as such updates are made available. The acquisition engine 120 may be configured to selectively incorporate RTS data 105 acquired in response to the monitoring, as disclosed herein.

The acquisition engine 120 may be configured to maintain transaction records 125, the transaction records 125 configured to represent respective transactions involving the user

101. The transaction records 125 may comprise a uniform representation of transactions involving a plurality of different vendors and/or a plurality of different carriers (e.g., may comprise a target configuration to which native data pertaining to such transactions may be transformed). As disclosed above, the acquisition engine 120 may assign one or more identifiers to respective transaction records 125. The identifier(s) of a transaction record 125 may comprise a VTI (e.g., an identifier assigned to the transaction by the vendor, such as an order number, invoice number, and/or the like). Respective vendors may reference transactions using the VTI assigned thereby and, as such, may include the VTI of respective transactions in messages and/or other information pertaining to the respective transactions (e.g., may include the VTI in messages sent to the user regarding respective transactions and/or transaction shipments). The RTS data 105 extracted from respective transaction data sources 103A-N may, therefore, comprise transaction data identified by use of vendor-specific VTI, which may not be unique across different vendors. In some examples, the acquisition engine 120 may be configured to form unique transaction identifiers from vendor-specific information extracted from respective transaction data sources 103. The acquisition engine 120 may be configured to generate a transaction identifier by, inter alia, combining a vendor-specific VTI with another identifier (e.g., an identifier assigned to the corresponding vendor). Although particular examples for uniquely identifying transactions (and/or generating unique transaction identifiers) are described herein, the disclosure is not limited in this regard and could be adapted to utilize any suitable scheme for identifying and/or naming respective transactions and/or transaction records 125.

As disclosed above, importing RTS data 105 pertaining to a transaction may comprise generating a new transaction record 125 to represent the transaction and/or updating an existing transaction record 125 corresponding to the transaction. In response to receiving RTS data 105, the acquisition engine 120 may determine whether the RTS data 105 pertains a transaction associated with an existing transaction record 125. If the RTS data 105 corresponds to an existing transaction record 125, the acquisition engine 120 may be configured to incorporate the RTS data 105 therein (e.g., update the existing transaction record 125 to include portion(s) of the RTS data 105). If the RTS data 105 does not correspond to an existing transaction record 125, the acquisition engine 120 may incorporate the RTS data 105 into a new transaction record 125. The acquisition engine 120 may determine whether the RTS data 105 corresponds to an existing transaction record 125 by, inter alia, comparing one or more identifiers of the RTS data 105 to identifiers of one or more existing transaction records 125 (e.g., a transaction identifier derived from vendor-specific VTI, as disclosed above). By way of non-limiting example, the acquisition engine 120 may extract first RTS data 105 from a transaction data source 103 (e.g., from an "order confirmation" email message sent from a particular vendor). The "order confirmation" email message (and first RTS data 105 extracted therefrom) may reference the transaction by use of a vendor-specific VTI, which may comprise an identifier assigned to the transaction by the particular vendor. The acquisition engine 120 may import the first RTS data 105, which may comprise generating a first transaction record 125. The importing may comprise determining a unique identifier for the transactions that incorporates the vendor-specific VTI (e.g., is a combination of the VTI and identifier of the particular vendor). After generating the first transaction record 125, the acquisition engine 120 may acquire second RTS data 105 (e.g., from a "shipping confirmation" email message sent a number of days after the initial "order confirmation" email message). The "shipping confirmation" email message (and the second RTS data 105 extracted therefrom) may reference the vendor-specific VTI assigned by the particular vendor. The acquisition engine 120 may import the second RTS data 105 into the transaction platform 110, which may comprise associating the second RTS data 105 with a unique transaction identifier (e.g., by combining the vendor-specific VTI with the identifier of the particular vendor), and may use the unique transaction identifier to determine that the second RTS data 105 pertains to an existing transaction record 125 (the first transaction record 125). The second RTS data 105 may, therefore, be imported into the first transaction record 125.

As disclosed above, the acquisition engine 120 may be configured to acquire, maintain, and/or update transaction records 125 pertaining to respective transactions involving the user 101 by, inter alia, extracting RTS data 105 from one or more transaction data sources 103A-N (in accordance with access data 115 of the user 101), and importing the data into the transaction platform 110, which may comprise incorporating the RTS data 105 into one or more transaction records 125, each transaction record 125 configured to represent a respective transaction involving the user 101. A transaction may involve one or more shipments (transaction shipments). The RTS data 105 pertaining to a transaction may comprise information pertaining to respective transaction shipments (e.g., shipment identifiers). The acquisition engine 120 may maintain information pertaining to respective transaction shipments in respective transaction records 125. The acquisition engine 120 may extract RTS data 105 comprising carrier and/or shipment identifiers of respective transaction shipments from one or more transaction data sources 103A-N, and may incorporate the RTS data 105 into the transaction platform 110, as disclosed herein. In some examples, the acquisition engine 120 may maintain information pertaining to the shipments associated with a transaction within the transaction record 125 corresponding to the transaction (or in separate transaction shipment records that reference and/or are linked to the corresponding transaction record 125). The acquisition engine 120 may be configured to maintain any suitable information pertaining to respective transaction shipments including, but not limited to: an identifier of the carriers assigned to handle respective transaction shipments (e.g., carrier name, identifier, URI, URL, and/or the like), shipment identifiers assigned to the respective transaction shipments (e.g., carrier-specific identifiers such as tracking numbers, confirmation numbers, delivery confirmation numbers, and/or the like), and so on.

The acquisition engine 120 may be further configured to obtain status information pertaining to respective transaction shipments from one or more shipment data sources 107. As used herein, a shipment data source 107 refers to any network-accessible system, platform, and/or service configured to store, maintain, and/or provide access to shipment status data. A shipment data source 107 may comprise shipment status pertaining to a designated carrier and may be configured to provide current status data pertaining to shipments handled by the designated carrier (in reference to shipment identifiers assigned to the shipments by the carrier). Alternatively, or in addition, a shipment data source 107 may be configured to maintain status data pertaining to particular types of shipments, such as overnight shipments, international shipments, and/or the like. A shipment data source 107 may correspond to a specified type and/or range of shipment identifiers (e.g., shipment identifiers, carrier identifiers, tracking numbers, confirmation numbers, and/or the like).

The acquisition engine 120 may be configured to obtain RTS data 105 comprising shipment status information from a plurality of different shipment data sources 107 (e.g., shipment data sources 107 A-N). The acquisition engine 120 may obtain and/or update status information of a transaction shipment associated with a transaction record 125 by, inter alia, sending a request to a selected shipment data source 107 (the shipment data source 107 selected in accordance with the carrier identifier and/or shipment identifier of the transaction shipment), receiving response data from the shipment data source 107, extracting RTS data 105 from the response data, and importing the RTS data 105 into the transaction platform 110, as disclosed herein. The acquisition engine 120 may be configured to request shipment status data in accordance with any suitable protocol (e.g., in accordance with a network access protocol and/or API supported by the shipment data source 107). The acquisition engine 120 may be further configured to access, interpret, analyze, parse, extract and/or import RTS data 105 comprising shipment status information in accordance with any suitable configuration (e.g., any suitable layout, structure, schema, encoding, data representation, namespace, and/or the like). In some examples, the acquisition engine 120 may be configured to transform response data returned from respective shipment data sources 107 A-N, as disclosed herein (e.g., transform shipment status information from a native configuration of the respective shipment data sources 107 A-N to a target configuration corresponding to the transaction records 125 maintained by the acquisition engine 120). The acquisition engine 120 may be configured to obtain and/or incorporate any suitable information pertaining to transaction shipments including, but not limited to: shipment status (e.g., whether the shipment is in transit, has been delivered, is on-time, is delayed, and/or the like), current physical location, estimated time of arrival (ETA), shipment exceptions (e.g., shipment routing and/or delivery exceptions), damage reports, and/or the like.

In some examples, the acquisition engine 120 is configured to monitor one or more of the shipment data sources 107 A-N. The acquisition engine 120 may be configured to periodically retrieve status information pertaining to selected transaction shipments and/or transaction shipments associated with selected transaction records 125 (e.g., once very T hours and/or days). Alternatively, or in addition, the acquisition engine 120 may be configured to monitor the shipment data sources 107 A-N continuously and/or in response to update requests (e.g., requests from the user 101). In some examples, the acquisition engine 120 may be configured to subscribe to shipment updates published by one or more shipment data sources 107 A-N, as disclosed herein. The acquisition engine 120 may be configured to receive shipment status information published by one or more shipment data sources 107 A-N as such updates to such shipment status information are made available.

Although FIG. 7 shows the acquisition engine 120 extracting RTS data 105 from separate data sources (e.g., separate transaction data sources 103, shipment data sources 107, vendors, and/or the like), the disclosure is not limited in this regard. In some examples, the acquisition engine 120 may be configured to obtain RTS data 105 from systems, platforms, and/or services configured to provide access to both transaction and shipment status information. The acquisition engine 120 may be configured to retrieve RTS data 105 comprising transaction and/or shipment status information from an ecommerce system, the ecommerce system configured to provide information pertaining to user transactions as well as shipment status information pertaining to shipments associated with the user transactions.

The acquisition engine 120 may be further configured to update status information pertaining to respective transactions and/or transaction shipments in accordance with RTS data 105 acquired thereby. The acquisition engine 120 may be configured to mark transaction shipments as complete in response to retrieving shipment status data indicating that the transaction shipment has been delivered (and/or has been accepted by the user 101). The acquisition engine 120 may be further configured to mark transaction records 125 as complete in response to determining that each transaction shipment thereof is complete (and/or in response to transaction data indicating completion of the transaction from the user 101, the vendor, a transaction data source 103, and/or the like).

The acquisition engine 120 may be further configured to generate and/or maintain transaction datasets 128 for respective users 101. Maintaining a transaction dataset 128 for a user may comprise maintaining and/or updating transaction records 125 pertaining to transactions involving the user 101. The transaction dataset 128 for user 101 may comprise transaction records 125 pertaining to active transactions involving the user 101. As used herein, an "active" transaction record 125 refers to a transaction record 125 pertaining to a transaction that has not been completed (and/or has not been marked as complete). As disclosed above, the acquisition engine 120 may determine the status of respective transaction records 125 based on RTS data 105 pertaining to the transaction retrieved from one or more data sources, the user 101, vendor, and/or the like. A transaction between a user 101 and a vendor may be completed when obligations of the user 101 and/or vendor pursuant to the transaction have all been satisfied (e.g., the user 101 has made required payment(s), and items purchased from the vendor have been delivered and/or accepted by the user 101).

The transaction dataset 128 of a user 101 may comprise a plurality of transaction records 125, the transaction records 125 comprising information pertaining to transactions with a plurality of different vendors and/or transaction shipments being handled by a plurality of different carriers. The acquisition engine 120 may extract RTS data 105 comprising the transaction records 125 from a plurality of different data sources in accordance with a plurality of different data access protocols and/or mechanisms, each data source having a different respective configuration. Accordingly, maintaining the transaction records 125 (and/or transaction dataset 128) may further comprise transforming RTS data 105 extracted from the plurality of data sources in accordance with a plurality of different native configurations to a unified, target configuration (e.g., uniform transaction records 125). Maintaining the transaction records 125 and/or transaction dataset 128 may, therefore, comprise aggregating and/or combining RTS data 105 that spans a plurality of different vendors, a plurality of different carriers, a plurality of different data sources, a plurality of different data access protocols, and/or a plurality of different configurations (e.g., a plurality of different data layouts, structures, formats, schemas, encodings, representations, namespaces, and/or the like).

Maintaining the transaction dataset 128 of the user 101 may comprise monitoring one or more data sources, retrieving RTS data 105 in response to the monitoring, and updating the transaction dataset 128 in accordance with the retrieved RTS data 105, as disclosed herein. The monitoring may comprise adding new transaction records 125 to the transaction dataset 128 (in response to retrieving RTS data 105 pertaining to new transactions involving the user 101 from one or more transaction data sources 103A-N), updating existing transaction records 125 in response to retrieving RTS data 105 from one or more transaction data sources 103A-N, updating existing transaction records 125 in response to accessing RTS data 105 comprising shipment status information from one or more shipment data sources 107 A-N, and so on. The monitoring may comprise marking one or more transaction shipments as complete and/or delivered (e.g., in response to importing shipment status data indicating delivery of the shipment and/or acceptance of the shipment by the user 101). The monitoring may further comprise marking one or more transaction records 125 as complete (e.g., in response to transaction data indicating that the transaction is complete and/or shipment status data indicating that each transaction shipment thereof has been delivered and/or accepted). The monitoring may, therefore, comprise adding transaction records 125 representing new transactions involving the user 101 to the transaction dataset 128 and/or removing existing transaction records 125 representing completed transactions from the transaction dataset 128.

The interface engine 130 may be configured to provide interface(s) for managing and/or visualizing transactions involving respective users 101. The interface engine 130 may be configured to power, implement, generate, and/or display an aggregated transaction and shipment interface (ATS interface 132), which may be configured to graphically display information pertaining to the transaction dataset 128 of a user 101. The ATS interface 132 may be configured to display information pertaining to a plurality of transactions involving the user 101 within a single, unified graphical user interface (GUI). The ATS interface 132 may be configured to graphically display information pertaining to a plurality of shipments, the shipments handled by a plurality of different carriers and comprising items purchased in transactions with a plurality of different vendors. In some examples, the interface engine 130 may be configured to implement the ATS interface 132 in conjunction with an application operating on a client computing device 102 (e.g., application 232, as disclosed in further detail herein).

The ATS interface 132 may be configured to display a transaction dataset 128 on a computing device display, such as a display of a client computing device 102. The client computing device 102 may comprise any device having processing, memory, storage, display, and/or communication resources capable of receiving and/or rendering the ATS interface 132, including, but not limited to: a personal computing device, a workstation, a mobile computing device, a laptop, a notebook, a netbook, a communication device, a smart phone, a smart watch, a personal digital assistant (PDA), and/or the like. The ATS interface 132 (and/or the other interface(s) disclosed herein) may comprise any suitable type of human-machine-interface (HMI) and/or any suitable HMI components. The ATS interface 132 may comprise a GUI configured for display at the client computing device 102. The ATS interface 132 may be embodied as computer-readable instructions stored on a non-transitory storage medium (e.g., the ATS interface 132 may be implemented by an application configured for operation on the client computing device 102 and embodied by instructions configured for execution on a processor thereof). Alternatively, or in addition, the ATS interface 132 may be rendered remotely (e.g., at the transaction platform 110) and/or embodied as markup data configured for rendering by an application operating on the client computing device 102 (e.g., a browser application).

The ATS interface 132 may be configured for display on a client computing device 102. As illustrated in FIG. 8A, the client computing device 102 may comprise a portable computing device, such as a smart phone, PDA, and/or the like. The disclosure is not limited in this regard, however, and could be adapted for use with any suitable type of client computing device 102. The client computing device 102 may comprise a display 202, a processor 203 (e.g., a general-purpose processor, application-specific processor, central processing unit, and/or the like), memory 204 (e.g., volatile memory, non-volatile memory, persistent memory, random access memory (RAM), dynamic RAM, static RAM, and/or the like), non-transitory storage 205 (non-volatile storage, persistent storage, solid-state storage, and/or the like), a communication interface 206, and/or the like. In some examples, the ATS interface 132 may be embodied as markup data transmitted to the client computing device 102 through the network 106 (via the communication interface 206).

In the FIG. 8A example, the ATS interface 132 may be embodied as an application 232 configured for operation on the client computing device 102. The application 232 may be embodied as instructions stored on non-transitory storage 205 of the client computing device 102, the instructions configured to cause the computing device 102 to display the ATS interface 132 on the display 202 (and/or implement other operations disclosed herein). The application 232 may be configured to display the ATS interface 132 in response to being launched (e.g., in response to the user 101 instantiating the application 232 through an operating system and/or launcher operating on the client computing device 102). The ATS interface 132 may be the first interface displayed by the application 232 (e.g., may comprise an initial interface of the application 232).

Figure 8B:
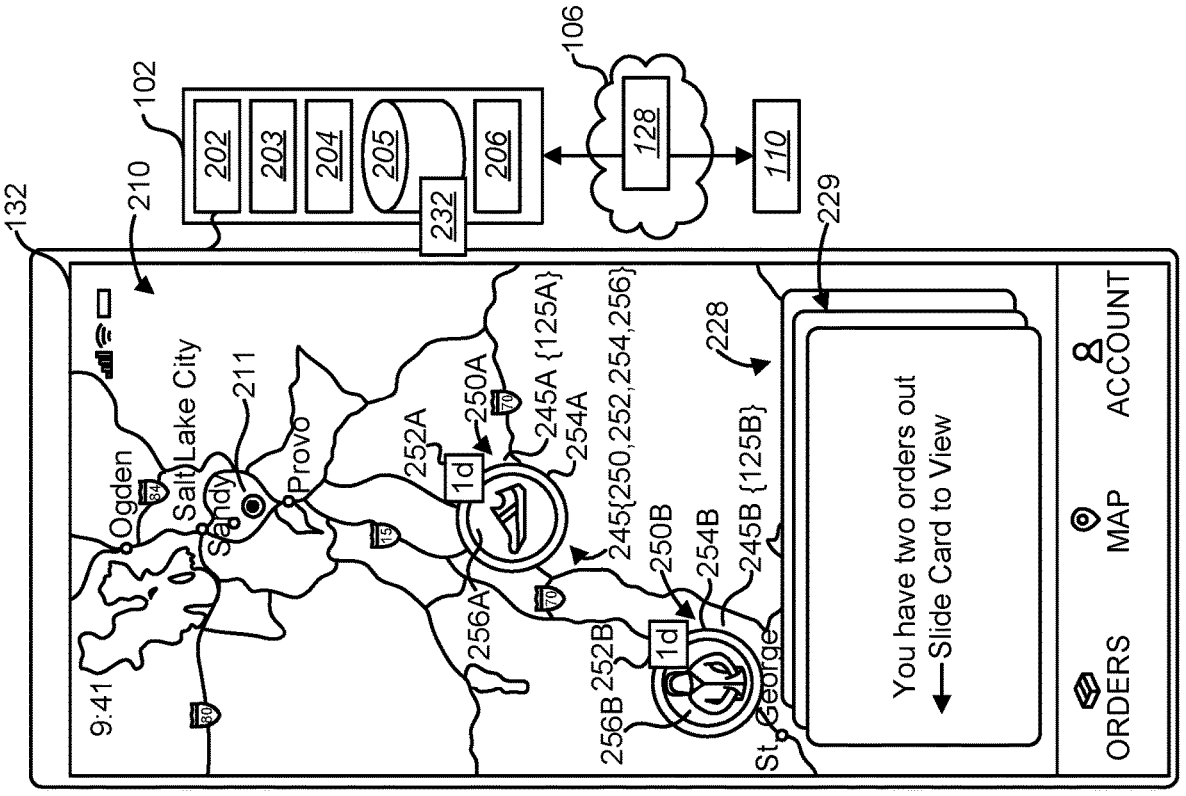
FIG. 8B depicts examples of an interface for visualizing a plurality of transactions spanning a plurality of different vendors and/or a plurality of different carriers.

FIG. 8B depicts one example of an ATS interface 132, as disclosed herein. The ATS interface 132 may be configured for display on a client computing device 102 (a portable computing device). The ATS interface 132 may be implemented by an application 232, which may be embodied as instructions stored on non-transitory storage 205 of the client computing device 102, the instructions configured to cause the computing device 102 to display the ATS interface 132 on the display 202 (and/or implement other operations disclosed herein). The application 232 may be configured to display the ATS interface 132 when launched (the ATS interface 132 may be a first GUI interface presented by the application 232).

As disclosed above, the ATS interface 132 may be configured to graphically display information pertaining to a transaction dataset 128 of a user 101. Displaying the ATS interface 132 may comprise accessing and/or receiving a transaction dataset 128 for the user 101 (and/or selected portions thereof). Displaying the ATS interface 132 may comprise accessing the transaction dataset 128 cached on the client computing device 102. Alternatively, or in addition, displaying the ATS interface 132 may comprise retrieving the transaction dataset 128 from the transaction platform 110 (via the network 106, by use of the communication interface 206 of the client computing device 102). In some examples, portions of the ATS interface 132 (e.g., markup data and/or computer-readable instructions thereof) may be received from the transaction platform 110 through the network 106. The ATS interface 132 may comprise a map component 210, which may be configured to display a graphical representation of a selected geographical area. A center of the selected geographical area may correspond to a delivery location associated with the transaction dataset 128. The delivery location may be represented by a delivery indicator 211 displayed on the map component 210. The delivery indicator 211 may correspond to a delivery address of the user 101 (e.g., the destination address for shipments of the transaction dataset 128). As disclosed in further detail herein, the geographical area covered by the map component 210 may correspond to, inter alia, the transaction dataset 128 being displayed by the ATS interface 132 (e.g., physical locations of respective transaction shipments of the transaction dataset 128 and/or the delivery location thereof).

The ATS interface 132 may be configured to graphically represent shipments corresponding to each transaction record 125 of the transaction dataset 128. In the FIG. 8B example, the ATS interface 132 may comprise one or more transaction shipment GUI components (TSG components 245), each TSG component 245 configured to represent a respective transaction shipment (e.g., a shipment associated with a specified transaction record 125, and/or transaction shipment thereof). The TSG components 245 may comprise GUI elements configured to graphically represent information pertaining to respective shipments, including, but not limited to: a current physical location of the shipment, an ETA of the shipment, a status of the shipment, items included in the shipment, and/or the like. The application 232 and/or ATS interface 132 may be configured to place TSG components 245 at selected locations within the map component 210 (map locations 250), which may be selected in accordance with the current physical location(s) of the shipments represented thereby. The map location 250 of a TSG component 245 may, therefore, indicate a current physical location of the shipment as reported by the shipment carrier and/or shipment data source 107 (as obtained by the acquisition engine 120). A TSG component 245 may further comprise one or more of: an ETA element 252 (configured to display the reported ETA of the shipment), a shipment status element 254 (comprising a graphical representation of a status of the shipment), an item display element 256 (configured to represent items included in the shipment), and/or the like. The shipment status element 254 may indicate a status of a shipment by use of a color, size, and/or intensity of the GUI element (e.g., a ring or other visual element). The ATS interface 132 may use light blue or green shipment status elements 254 to represent nominal shipments (shipments that are on-time, have no exceptions, have no reported damage, and/or the like), and may use bright red or orange shipment status elements 254 to represent shipments subject to exceptions (e.g., shipments that have been delayed, misrouted, have reported damage, and/or the like). The item display element 256 may comprise a visual representation of the contents of a shipment (e.g., a picture or other visual representation of one or more items included in the shipment).

In the FIG. 8B example, the ATS interface 132 may comprise a plurality of TSG components 245, including a first TSG component 245A and a second TSG component 245B. The first TSG component 245A may be configured to represent a first shipment and the second TSG component 245B may be configured to represent a second shipment. The first shipment may pertain to a first transaction (a first transaction record 125A), may comprise items purchased from a first vendor, and may be handled by a first carrier. The second TSG component 245B may pertain to a second transaction (a second transaction record 125B), may comprise items purchased from a second vendor, and may be handled by a second carrier. The ATS interface 132 illustrated in FIG. 8A may, therefore, graphically depict transactions corresponding to a plurality of different vendors having corresponding shipments handled by a plurality of different carriers. The map location 250A of the first TSG component 245A within the map component 210 may correspond to a physical location of the first shipment (as indicated by the first transaction record 125A), and the map location 250B of the second TSG component 245B may correspond to a physical location of the second shipment (as indicated by the second transaction record 125B). The ETA of the first and second shipments may be one day (as indicated by ETA elements 252A and 252B, respectively). The shipment status element 254A of the first TSG component 245A may visually indicate that the status of the first shipment is nominal. The shipment status element 254B of the second TSG component 245B may indicate that the status of the second shipment is non-nominal (that shipping exceptions have occurred). The item display element 256A may indicate that the first shipment comprises a pair of running shoes and the item display element 256B may indicate that the second shipment comprises a hooded sweatshirt.

In some examples, the ATS interface 132 may select the geographical area covered by the map component 210 (e.g., adjust the scale and/or position of the map component 210) based on, inter alia, physical locations of shipments included in the transaction dataset 128 and/or the destination location of the shipments. The ATS interface 132 may adjust the scale of the map component 210 such that the geographical area covered thereby includes the current physical location of each shipment. Alternatively, or in addition, the ATS interface 132 may be configured to provide for manual adjustment of the scale of the map component 210, the geographical area covered by the map component 210, and/or the like.

The ATS interface 132 may further comprise a transaction control 228. The transaction control 228 may provide for selection of respective transactions (and/or transaction shipments) of the transaction dataset 128 being displayed within the ATS interface 132. In the FIG. 8B example, the transaction control 228 may indicate a number of transactions being displayed in the ATS interface 132 (e.g., indicate that the transaction dataset 128 comprises 2 active transactions). In some examples, the transaction control 228 may provide for accessing information pertaining to selected transactions. The transaction control 228 may comprise a card interface comprising a plurality of card elements 229, each card element 229 corresponding to a respective transaction record 125. The transaction control 228 may provide for user selection of respective transactions in response slide and/or swipe inputs. In some examples, the transaction control 228 may be unselected (may not select any particular transaction record 125, as illustrated in the FIG. 8B example). Alternatively, the transaction control 228 may be configured to designate an initially selected transaction record 125 (e.g., a most recent transaction, an oldest transaction, a transaction having exceptions, and/or the like).

In some examples, the interface 132 may further comprise an update control (not shown in FIG. 8B to avoid obscuring details of the illustrated examples). The update control may be configured to receive update inputs from the user 101. In response to an update input, the application 232 may transmit an update directive to the transaction platform 110 and, in response to the update directive, the transaction platform 110 may instruct the acquisition engine 120 to retrieve updated RTS data 105 pertaining to transactions involving the user 101 (and/or respective transaction shipments), as disclosed herein. In some examples, the update control may be configured to receive selective update inputs, which may correspond to specified transactions and/or transaction shipments (e.g., the update control may provide for selecting and/or may be displayed on a card element 229 corresponding to a particular transaction record 125 and/or a TSG component 245 corresponding to a particular transaction shipment). In response to a selective update input, the application 232 may transmit a selected update directive to the transaction platform 110 (specifying a selected transaction record 125 and/or transaction shipment) and, in response, the transaction platform 110 may instruct the acquisition engine 120 to attempt to retrieve updated RTS data 105 pertaining to the selected transaction record 125 and/or transaction shipment, as disclosed herein.

Figure 8C:
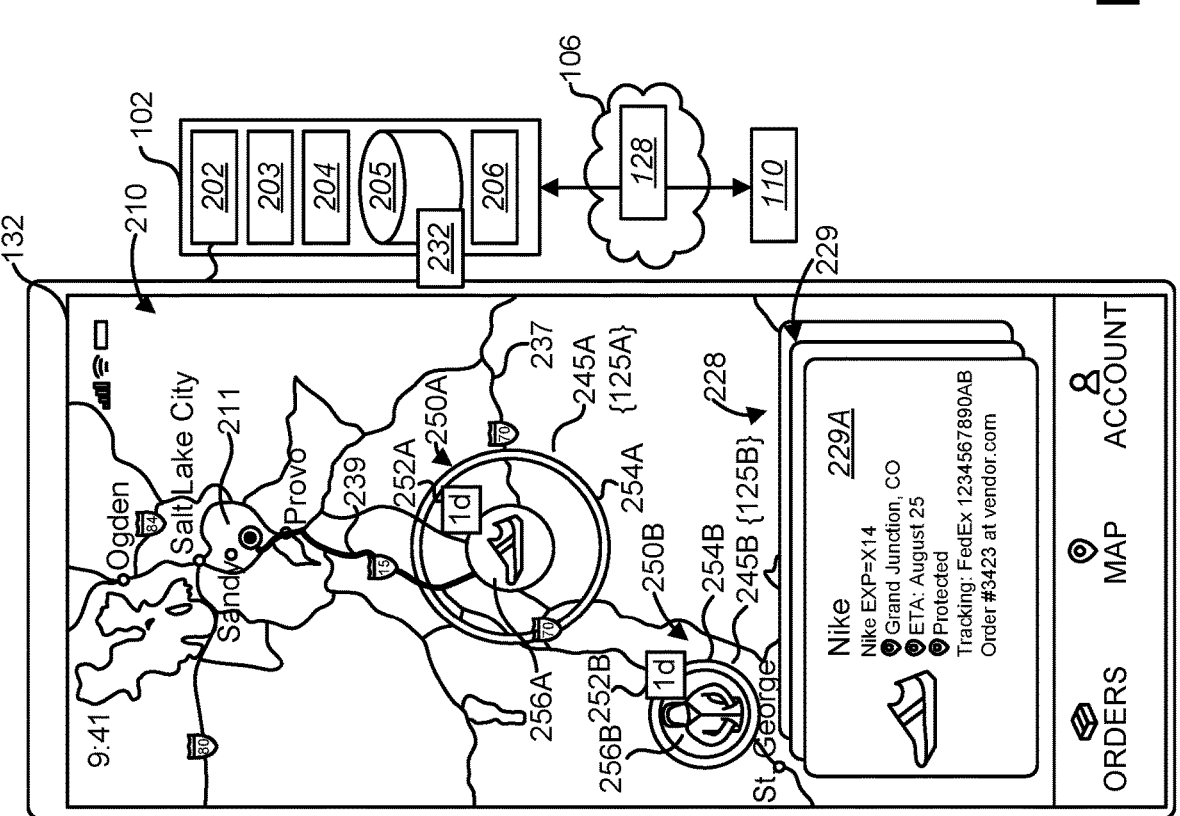
FIG. 8C depicts further examples of an interface of a plurality of transactions spanning a plurality of different vendors.

FIG. 8C depicts further examples of the disclosed ATS interface 132. In the FIG. 8C example, the transaction control 228 is configured to select transaction record 125A (and/or the shipment corresponding to TSG component 245A). The selection may correspond to user interaction with the transaction control 228 (e.g., in response to swipe and/or slide gesture inputs to the transaction control 228). In response to the selection, the transaction control 228 may be configured to display a card element 229A comprising information pertaining to the selected transaction record 125A. The card element 229A may indicate items purchased in the transaction (e.g., may comprise a graphical depiction of one or more of the items), identify the current physical location of the transaction shipment, display the estimated delivery date for the shipment, indicate whether the transaction and/or shipment is insured (e.g., protected), and so on. The card element 229A may further specify the source of tracking information for the transaction and/or shipment (e.g., specify the shipment identifier and/or provide a link to directly access tracking information maintained by the carrier). The card element 229A may be further configured to identify the vendor associated with the transaction (e.g., vendor.com), display the VTI of the transaction (e.g., order #3432), provide a link to the transaction at the vendor, and/or the like.

The application 232 (and/or ATS interface 132) may be further configured to modify one or more GUI elements and/or components of the ATS interface 132 in response to selection of the transaction record 125A. As illustrated in FIG. 8C the modifications may comprise highlighting the TSG component 245A corresponding to the selected transaction record 125A, which may comprise increasing a size of the TSG component 245A and/or respective GUI elements thereof (e.g., expanding the shipment status element 254A). The modifications may further comprise displaying visual representations of the tracking history of transaction shipments, such as visual representations of the path by which the shipment reached its current physical location (e.g., visual history representation 237 illustrated in FIG. 8C). The modifications may further comprise displaying visual representations of a projected path of the transaction shipments, such as visual representations of the path the shipment is projected to follow to reach the destination location (e.g., projected path representation 239 illustrated in FIG. 8C). Selection of the card element 229A and/or shipment component 245A may invoke an interface configured to display further details pertaining to the transaction.

Although particular examples of GUI components and/or elements are illustrated and described herein, the disclosure is not limited in this regard and could be adapted to incorporate any suitable GUI components and/or element configured to visually represent any suitable information pertaining to transactions and/or shipments, as disclosed herein.

The application 232 may provide interfaces to enable users 101 to register with the transaction platform 110 (e.g., establish a user record 114 and access data 115, as disclosed herein). After initial launch, the application 232 may determine whether the user 101 of the application 232 has registered with the transaction platform 110. If not, the application 232 may prompt the user 101 to register, as disclosed herein. In response to determining that the user 101 has registered with the transaction platform 110 (and has established access data 115 enabling the transaction platform 110 to obtain transaction data pertaining to transactions involving the user), the application 232 may initially invoke the ATS interface 132, as disclosed herein.

Referring back to FIG. 7, the transaction records 125 maintained by the acquisition engine 120 may be configured to represent respective transactions involving the user 101, and may be embodied as electronically encoded data maintained on a non-transitory storage medium. In some examples, a transaction record 125 may comprise one or more of a:

| Field | Description |
| --- | --- |
| transaction identifier | Unique identifier of the transaction (e.g., combination of transaction identifier and vendor identifier). |
| user identifier | Identifier(s) of user(s) 101 associated with the transaction (may specify delivery location for transaction shipments). |
| vendor identifier | Identifier of the vendor associated with the transaction (name, URI, URL, etc.). |
| vendor transaction identifier | Identifier assigned to the transaction by the vendor (e.g., order number, invoice, and/or the like). |
| transaction items+ (items) | Information pertaining to item(s) purchased in the transaction. |
| transaction value (value) | Value of the transaction (total cost including tax, shipping, and/or the like). |
| transaction receipt+ | Information pertaining to satisfaction of the transaction by the buyer (user 101), such as payment methods and/or amounts. |
| Insurance | Information pertaining to insurance covering the transaction (if any). |
| Shipment records+ | Information pertaining to respective shipments associated with the transaction (transaction shipments). |
| transaction status | Indication of the status of the transaction (active, completed, disputed, etc.). |

As illustrated above, a transaction record 125 may comprise pertaining to one or more shipments (e.g., shipment records), which may be embodied as electronically encoded data maintained on a non-transitory storage medium. In some examples, a shipment record may comprise one or more of a:

| Field | Description |
| --- | --- |
| carrier identifier | Identifier of the carrier handling the shipment (name, URL, URI, etc.). |
| shipment identifier | Identifier assigned to the shipment by the carrier (e.g., tracking number). |
| shipment status | Status of the shipment (in transit, delivered, on-time, delayed, etc.). |
| shipment location | Current physical location of the shipment. |
| shipment exceptions | Information pertaining to shipment exceptions (e.g., delays, routing exceptions, etc). |

-continued

| Field | Description |
| --- | --- |
| shipment damage | Information pertaining to reported damage to the shipment. |
| Destination | Location to which the shipment is being delivered. |
| Configuration | Information pertaining to access mechanism and/or configuration of shipment data accessible through shipment data source. |
| items+ | Items included in the shipment. |

Information pertaining to items included in respective transactions and/or shipments may be maintained in respective item records, which may be embodied as electronically encoded data maintained on a non-transitory storage medium and may include one or more of a:

| Field | Description |
| --- | --- |
| item identifier | Unique identifier of the item at a specified vendor (name, UPC, price, vendor identifier, etc.). |
| item options | Options pertaining to the item, such as color, size, and/ or the like. |
| reorder information | Information to enable re-ordering of the item (e.g., a link to vendor, URI, URL, etc.). |

A transaction record 125 may be associated with a user 101 (as represented by corresponding user records 114). A user record 114 may be embodied as electronically encoded data maintained on a non-transitory storage medium and may include, but is not limited to a:

| Field | Description |
| --- | --- |
| user identifier | Unique identifier of the user 101 at the transaction platform 110 (and/or third-party identity service) |
| contact | Contact address(es) of the user (e.g., email address, instant messaging address, text messaging address, and/or the like). |
| access+ | Access data 115 configured to enable the acquisition engine 120 to obtain data pertaining to transactions of the user 101 from one or more transaction data sources 103. |
| active transactions+ | Identifier(s) of transaction records corresponding to active transactions involving the user 101. |
| recent transactions+ | Identifier(s) of transaction records corresponding to recently completed transactions involving the user 101. |
| saved transactions+ | Identifier(s) of transaction records corresponding to completed transactions saved by the user 101. |

Access data 115 may be embodied as electronically encoded data maintained on a non-transitory storage medium and may include, but is not limited to a:

| Field | Description |
| --- | --- |
| data source identifier | Unique identifier of the data source registration. |
| data source user identifier | Identifier of the user at the specified data source. |
| data source credential | Credential for use in authenticating to the specified data source. |
| data source protocol | Information pertaining to protocols by which data records may be accessed from the specified data source. |
| data source configuration | Information pertaining to the configuration of data maintained by specified data source. |

As disclosed above, the acquisition engine 120 may be configured to track the status of respective transactions (and/or transaction shipments). The acquisition engine 120 may be configured to monitor the status of respective transactions and/or transaction shipments. The acquisition engine 120 may maintain a transaction dataset 128 based on the monitoring.

In some examples, the transaction platform 110 may be further configured to maintain a recent transactions dataset comprising transaction records 125 corresponding to recently completed transactions involving the user 101. The transaction records 125 may be added to the recent trans-actions dataset in response to being marked as complete. Transaction records 125 may be removed from the recent transactions dataset after a pre-determined time (e.g., after T days or weeks). The interface engine 130 may be configured to generate a GUI configured to display information per-taining to the recent transactions dataset (a recent transac-tions GUI). The recent transactions GUI may facilitate re-ordering one or more recently purchased items. The recent transactions GUI may further comprise means for retaining selected transaction records in a saved transactions dataset. Transactions recorded in the saved transactions dataset may be retained until explicitly deleted. The inter-face engine 130 may be configured to generate a GUI configured to display information pertaining to the saved transactions dataset (a saved transactions GUI).

In some examples, the transaction platform 110 may further comprise and/or host a vendor-side transaction com-ponent (vendor component 134). The vendor component 134 may be configured to integrate into one or more trans-action interfaces of the vendor (e.g., may be configured for integration into a checkout interface of the vendor). The vendor component 134 may be configured to accept user registration data during a checkout process at the vendor (e.g., may provide prompts to opt-in and/or register for transaction aggregation, management, and/or visualization services, as disclosed herein). The vendor component 134 may comprise a check-box input requesting permission to share information pertaining to the user 101 maintained by the vendor with the transaction platform 110 (e.g., email, information pertaining to transactions between the user 101 and the vendor, and so on). Alternatively, or in addition, the vendor component 134 may comprise input components to prompt for and/or receive user registration information, as disclosed herein (e.g., facilitate creation of a user record 114 and/or registration of access data 115, as disclosed herein).

In some examples, the vendor component 134 may be further configured to present one or more offers pertaining to the transaction being established between the user 101 and the vendor (the vendor transaction). The vendor component 134 may determine a quote for insurance covering the vendor transaction. The vendor component 134 may deter-mine the quote in accordance with information pertaining to the vendor transaction (e.g., information pertaining to items being purchased in the vendor transaction, the value of the items, the overall value of the vendor transaction, the destination of the items purchased in the vendor transaction, payment method(s) of the user 101, and/or the like). The vendor component 134 may capture information pertaining to the vendor transaction from one or more vendor interfaces (e.g., from one or more transaction interfaces of the vendor), may request transaction information from the vendor, may receive the transaction information from the vendor (e.g., the vendor may provide transaction information when instanti-ating the vendor component 134), and/or the like. The vendor component 134 may determine the insurance quote using any suitable mechanism including, but not limited to: applying one or more pre-determined rules or formula to derive the quote from the transaction information, sending a request for an insurance quote to the transaction platform 110, sending a request for an insurance quote to a third party (including portion(s) of the transaction information, as dis-closed herein), and/or the like. The vendor component 134 may be further configured to display the insurance quote and may comprise input components by which the user 101 may purchase insurance coverage in accordance with the quote. In some examples, the vendor component 134 may be configured to modify the transaction in response to accep-tance of the insurance quote. The modifying may comprise instructing the vendor to include the cost of the insurance in the cost of the vendor transaction. Alternatively, the vendor component 134 provide for purchasing insurance coverage in a separate transaction independent of the vendor transac-tion. In response to the purchasing of insurance coverage, the vendor component 134 may transmit information per-taining to the purchased insurance to the transaction plat-form 110, which may record the insurance coverage infor-mation in transaction record(s) 125 (and/or transaction shipment records) configured to represent the transaction and/or corresponding shipments.

The term "determining" encompasses a wide variety of actions and, therefore, "determining" can include calculat-ing, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a program-mable logic device (PLD), a field programmable gate array (FPGA), etc. The term "processor" may refer to a combi-nation of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EE-PROM), flash memory, magnetic or optical data storage, registers, etc. Memory is said to be in electronic communi-cation with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair. DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method by a computing device, comprising:

receiving an email for an order by accessing, via a transaction platform, a third party email system;

sorting, by the transaction platform, a keyword list based on priority values of order detail keywords, wherein a first priority value is based on language indicating that a corresponding order detail is directly after a first order detail keyword;

separating, by the transaction platform, the email into fragments, wherein the separating the email into the fragments comprises breaking the email into the fragments at newlines;

searching, by the transaction platform, for each of the order detail keywords in the fragments based on the priority values, wherein a scope of search is narrowed first using the searching for each of the order detail keywords before using a regular expression search to lessen noise signals;

detecting, by the transaction platform, an order detail keyword in a current fragment;

searching, by the transaction platform, the current fragment and a defined number of fragments after the current fragment for an order detail;

searching, by the transaction platform, for the order detail in response to detecting the order detail keyword in the current fragment, wherein the order detail comprises an alphanumeric string between 10 and 34 characters when the order detail is a tracking number or a length between 4 and 30 characters when the order detail is an order number, storing, on a cache of the computing device, transaction data of the order extracted from the email, wherein the transaction data includes the order detail;

aggregating, a plurality of transaction data from a plurality of orders stored on the cache, wherein the plurality of transaction data from the plurality of orders includes the transaction data of the order and the plurality of transaction data from the plurality of orders includes transaction data accessed from two or more third party systems;

displaying, based on the plurality of transaction data from the plurality of orders and on a display of the computing device, a plurality of card elements, wherein each transaction data in the plurality of transaction from the plurality of orders corresponds to a card element of the plurality of card elements;

receiving a swipe input to select the transaction data of the order; and in response to the swipe input, sliding a first card element of the plurality of card elements into or out of a portion of the display to reveal a second card element including the transaction data of the order.

2. The method of claim 1, wherein the order detail comprises the tracking number.

3. The method of claim 1, wherein the order detail comprises the order number.

4. The method of claim 1, further comprising converting the fragments to lowercase letters.

5. The method of claim 1, further comprising:

saving the order detail to memory in response to detecting the order detail in the current fragment or a fragment after the current fragment.

6. A computing device, comprising:

a processor and memory, the processor to:

receive an email for an order by accessing, via a transaction platform, a third party email system;

sort, by the transaction platform, a keyword list based on priority values of order detail keywords, wherein a first priority value is based on language indicating that a corresponding order detail is directly after a first order detail keyword;

separate, by the transaction platform, the email into fragments, wherein the separating the email into the fragments comprises breaking the email into the fragments at newlines;

search, by the transaction platform, for each of the order detail keywords in the fragments based on the priority values, wherein a scope of search is narrowed first using the searching for each of the order detail keywords before using a regular expression search to lessen noise signals;

detect, by the transaction platform, an order detail keyword in a current fragment;

search, by the transaction platform, the current fragment and a defined number of fragments after the current fragment for an order detail;

search, by the transaction platform, for the order detail in response to detecting the order detail keyword in the current fragment, wherein the order detail comprises an alphanumeric string between 10 and 34 characters when the order detail is a tracking number or a length between 4 and 30 characters when the order detail is an order number;

store, on a cache of the computing device, transaction data of the order extracted from the email, wherein the transaction data includes the order detail;

aggregate, a plurality of transaction data from a plurality of orders stored on the cache, wherein the plurality of transaction data from the plurality of orders includes the transaction data of the order and the plurality of transaction data from the plurality of orders includes transaction data accessed from two or more third party systems;

display, based on the plurality of transaction data from the plurality of orders and on a display of the computing device, a plurality of card elements, wherein each transaction data in the plurality of transaction from the plurality of orders corresponds to a card element of the plurality of card elements;

receive a swipe input to select the transaction data of the order; and in response to the swipe input, slide a first card element of the plurality of card elements into or out of a portion of the display to reveal a second card element including the transaction data of the order.

7. The computing device of claim 6, wherein the order detail comprises the tracking number.

8. The computing device of claim 6, wherein the order detail comprises the order number.

9. The computing device of claim 6, further comprising converting the fragments to lowercase letters.

10. The computing device of claim 6, wherein the processor is to:

save the order detail to the memory in response to detecting the order detail in the current fragment or a fragment after the current fragment.

11. A non-transitory tangible computer-readable medium comprising instructions when executed cause a processor of a computing device to:

receive an email for an order by accessing, via a transaction platform, a third party email system;

sort, by the transaction platform, a keyword list based on priority values of order detail keywords, wherein a first priority value is based on language indicating that a corresponding order detail is directly after a first order detail keyword;

separate, by the transaction platform, the email into fragments, wherein the separating the email into the fragments comprises breaking the email into the fragments at newlines;

search, by the transaction platform, for each of the order detail keywords in the fragments based on the priority values, wherein a scope of search is narrowed first using the searching for each of the order detail keywords before using a regular expression search to lessen noise signals;

detect, by the transaction platform, an order detail keyword in a current fragment;

search, by the transaction platform, the current fragment and a defined number of fragments after the current fragment for an order detail;

search, by the transaction platform, for the order detail in response to detecting the order detail keyword in the current fragment, wherein the order detail comprises an alphanumeric string between 10 and 34 characters when the order detail is a tracking number or a length between 4 and 30 characters when the order detail is an order number;

store, on a cache of the computing device, transaction data of the order extracted from the email, wherein the transaction data includes the order detail;

aggregate, a plurality of transaction data from a plurality of orders stored on the cache, wherein the plurality of transaction data from the plurality of orders includes the transaction data of the order and the plurality of transaction data from the plurality of orders includes transaction data accessed from two or more third party systems;

display, based on the plurality of transaction data from the plurality of orders and on a display of the computing device, a plurality of card elements, wherein each transaction data in the plurality of transaction from the plurality of orders corresponds to a card element of the plurality of card elements;

receive a swipe input to select the transaction data of the order; and in response to the swipe input, slide a first card element of the plurality of card elements into or out of a portion of the display to reveal a second card element including the transaction data of the order.

12. The non-transitory tangible computer-readable medium of claim 11, wherein the order detail comprises the tracking number.

13. The non-transitory tangible computer-readable medium of claim 11, wherein the order detail comprises the order number.

14. The non-transitory tangible computer-readable medium of claim 11, wherein the instructions when executed cause the processor to convert the fragments to lowercase letters.

15. The non-transitory tangible computer-readable medium of claim 11, further comprising instructions when executed cause the processor to:

save the order detail to memory in response to detecting the order detail in the current fragment or a fragment after the current fragment.

* * * * *